United States Patent
Yoshida et al.

(10) Patent No.: US 6,310,953 B1
(45) Date of Patent: Oct. 30, 2001

(54) SUBSCRIBER CIRCUIT

(75) Inventors: Kazuhiro Yoshida; Kenji Takato, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/067,902

(22) Filed: Apr. 28, 1998

(30) Foreign Application Priority Data

Jul. 24, 1997 (JP) .................................... 9-198429
Jul. 24, 1997 (JP) .................................... 9-198430
Aug. 29, 1997 (JP) .................................... 9-234732

(51) Int. Cl.$^7$ .................................................. H04M 1/00
(52) U.S. Cl. ................. 379/399.01; 379/395.01
(58) Field of Search ................... 379/377–379, 379/382, 387, 391–392, 399–403, 412–413, 395.01

(56) References Cited

U.S. PATENT DOCUMENTS

| | | | | |
|---|---|---|---|---|
| 3,903,375 | * | 9/1975 | DeWit .................................. | 379/379 |
| 4,465,967 | * | 8/1984 | Tokunaga et al. .................... | 379/387 |
| 4,490,580 | * | 12/1984 | Nagashima .......................... | 379/379 |
| 5,862,213 | * | 1/1999 | Klamt et al. ......................... | 379/413 |

\* cited by examiner

*Primary Examiner*—Sinh Tran
*Assistant Examiner*—George Eng
(74) *Attorney, Agent, or Firm*—Helfgott & Karas, P.G.

(57) ABSTRACT

In a subscriber circuit implementing the analog system, the 2B1Q system and the ping-pong system, a signal processing unit is divided into a signal output unit for outputting a signal for transmission and a bias unit for providing a voltage, the signal output unit being implemented by an amplifier unit characterized by a low withstand voltage and a broadband characteristic, and the bias unit is implemented by an amplifier unit characterized by a high withstand voltage and a narrowband characteristic.

7 Claims, 29 Drawing Sheets

|  | SIGNAL SYMBOL | SIGNAL SPEED | SIGNAL AMPLITUDE | TERMINATION |
|---|---|---|---|---|
| ANALOG SYSTEM | ANALOG | 300~3400Hz | 1.55V op(MAX) | 600ΩETC. |
| 2B1Q SYSTEM | 2B1Q | 160Kb/s | 2.5V op | 135Ω |
| PING-PONG SYSTEM | AM1 | 320Kb/s | 6V op | 110Ω |

FIG.35

|  | EN | DOWN/UP |
|---|---|---|
| Ddc>Dst | L | L |
| Ddc=Dst | H | X |
| Ddc<Dst | L | H |

SUBSCRIBER CIRCUIT

BACKGROUND OF THE INVENTION

1. Field of the Invention

The present invention generally relates to subscriber circuits and, more particularly, to a subscriber circuit which can be used both as a subscriber circuit for an analog system and a subscriber circuit for a digital system.

2. Description of the Related Art

In a digital telephone system, a basic-rate subscriber circuit transmitting a digital signal (according to the 2B1Q system or the ping-pong system) is used. In an analog telephone system, a subscriber circuit for transmitting a sound signal is used. Hereinafter, a subscriber circuit for a digital subscriber system will be referred to as a digital subscriber circuit, and a subscriber circuit for an analog subscriber system will be referred to as an analog subscriber circuit, In the past, an analog subscriber circuit and a digital subscriber circuit are implemented by different circuits since, the digital system carries two times as much information as the analog system and is also different from the analog system in a signal symbol and a signal voltage used in the system.

FIG. 1 is a table comparing the analog subscriber circuit, the digital subscriber circuit for the 2B1Q system and the digital subscriber circuit for the ping-pong system, with respect to a signal symbol, a signal speed, a signal amplitude and termination.

For example, the signal speed of the analog system is 300–3400 Hz, the signal speed of the 2B1Q system is 160kbps and the signal speed of the ping-pong system is 320 kbps. The signal amplitude of the analog system is $1.55V_{OP}$ ($V_{OP}$ indicates a voltage between 0 and a peak value). The signal amplitude of the 2B1Q system is $2.5V_{OP}$ and the signal amplitude of the ping-pong system is $6V_{OP}$. The termination resistance of the analog system is 600 Ω, the termination resistance of the 2B1Q system is 135 Ω and the termination resistance of the ping-pong system is 110 Ω.

Accordingly, when a subscriber wants a change from an analog system to a digital system (2B1Q or ping-pong), it is necessary to manually substitute a new printed circuit board (PCB) for an existing one.

For example, if a system is installed in a location away from an exchange, a maintenance person must be called in to exchange PCBs. Thus, it is time-consuming and uneconomical to shift from one type of system to another.

Accordingly, it is demanded that both the analog facilities and the digital facilities are implemented by the same PCB.

FIG. 2 shows a construction of an analog subscriber circuit according to the related art.

Referring to FIG. 2, a codec 1 performs conversion of a sound signal. The codec 1 is connected between a subscriber circuit and a highway (HW). A data input terminal (D-IN) and a data output terminal (D-OUT) are connected to the highway.

A digital sound signal is converted into an analog signal by the codec 1 and output from an analog output terminal (A-OUT). A received signal is fed to an analog input terminal (A-IN). A feedback circuit 2 is connected between the analog input terminal A-IN and the analog output terminal A-OUT. The feedback circuit 2 is formed by an internal termination resistance 2a.

Amplifiers 3 and 4 receive an analog output of the codec 1 so as to amplify the same (the amplifier 4 is an inversion amplifier). A bias voltage supply unit 5 receives outputs of the amplifiers 3 and 4 so as to provide a bias voltage. The bias voltage supply unit 5 is formed by a bias circuit 5a. A power supply voltage $V_{BB}$ (–48V) is supplied to the bias circuit 5a.

A signal output unit 6 receives an output of the bias voltage supply unit 5 and outputs a sound signal. The signal output unit 6 consists of amplifiers AP1 and AP2 constituting a buffer amplifier. Operation amplifiers are used to construct these amplifiers AP1 and AP2. A phase compensation circuit 7 performs phase compensation for these amplifiers and is implemented by a capacitor C1.

An output of the amplifier AP1 is connected to line A via an external termination resistance R, and an output of the amplifier AP2 is connected to line B via an external termination resistance R. A telephone set (not shown) is connected between line A and line B. A signal reception unit 8 receives the sound signal from line A and line B and is formed by a differential amplifier AP3. The differential amplifier AP3 is implemented by an operational amplifier, and the output of the signal reception unit AP3 is connected to the analog input terminal A-IN of the codec 1 described above.

A description will be given of an operation of the circuit constructed above.

The analog subscriber circuit of FIG. 2 superimposes an analog signal of 300 Hz–3400 Hz and a maximum level of 3.17 dBmO (zero-relative level) to an bias voltage generally having a level of –48 V, as a differential signal, and outputs the superimposed signal to the subscriber lines (line A, line B). The zero-relative level indicates a level with respect to a reference level of 0.

For example, in the case of an impedance line of 600 Ω, a voltage level for supplying lmW to the impedance line of OdBmO=600 Ω is 0.775 (V).

A signal for transmission is output from the analog output terminal (A-OUT) of the codec 1, amplified by the amplifiers 3 and 4, and superimposed on the bias voltage by the bias voltage supply unit 5. Each output of the bias circuit 5a is fed to line A and line B of the subscriber as a differential analog signal from the signal output amplifiers AP1 and AP2.

The received signal is input to the differential amplifier AP3 of the signal reception unit 8, connected to the internal termination resistance 2a, and input to the analog input terminal (A-IN) of the codec 1. The received signal is fed back via the feedback circuit 2 to the signal output unit, so that termination of the two lines is effected.

In this way, in an analog subscriber circuit, a feedback system involving many amplifiers is produced so that the termination is effected accordingly. The phase compensation circuit 7 is provided for each of the operational amplifiers AP1 and AP2 so as to prevent oscillation and provide proper phase compensation.

FIG. 3 shows a construction of an operational amplifier. Because feedback is employed in the analog subscriber circuit, the phase compensation circuit 7 is provided so as to prevent oscillation. FIG. 4 is a graph showing a gain-frequency characteristic of the operational amplifier used in a subscriber circuit. The gain (dB) is vertically plotted and the frequency (Hz) is horizontally plotted. The graph of FIG. 4 is called a Bode diagram.

Curve f1 indicates an open loop characteristic of the amplifier, wherein phase compensation is not performed. The characteristic as indicated by curve f1 is used in the ping-pong system. Referring to curve f1, stages are produced at 6 dB/oct and 12 dB/oct. Inclination at 12 dB/oct; indicates that the output phase is 180° displaced with respect to the input so that a negative feedback ends; up as a positive feedback. If the feedback circuit remains unmodified, oscillation results.

Curve f2 indicates a frequency characteristic, wherein phase compensation is performed. The characteristic as indicated by curve f2 is used in the 2B1Q system. Curve f3 indicates a frequency characteristic, wherein sufficient phase compensation is performed so that oscillation is not caused in the circuit even when feedback is performed. The characteristic as indicated by curve f3 is used in the analog system. Inclination of curve f3 is 6 dB/oct.

Referring to FIG. 2, the external termination resistance R coupled to the subscriber line is provided as a protection resistance of, for example, 50 Ω. For example, when the termination of 600 Ω is to be implemented, the feedback circuit provides the remaining 500 Ω (=600−50×2).

FIG. 5 shows a construction of a conventional subscriber circuit for the 2B1Q system. In FIGS. 2 and 5, like numerals designate like elements. The 2B1Q system uses digital signals of four levels (+3, −3, +1, −1). A frequency spectrum of 40 kHz–80 kHz is required.

Referring to FIG. 5, the subscriber circuit comprises an interface unit provided between the subscriber circuit and the highway (HW), amplifiers 3 and 4 for amplifying an output signal, and a signal output unit 6 for receiving an output of the amplifiers 3 and 4. The signal output unit 6 consists of operational amplifiers AP1 and AP2. Capacitors C2 are coupled to the operational amplifiers AP1 and AP2 so as to constitute phase compensation circuits 7. The value of the capacitor C2 is controlled to be smaller than the value of the capacitor C1 in the analog subscriber circuit shown in FIG. 2.

A transformer T1 has its secondary side connected between the operational amplifiers AP1 and AP2. The primary winding of the transformer T1 is connected to line A and line B. A power feed circuit 10 supplies a dc current to the transformer T1. A capacitor C is coupled to the secondary side of the transformer T1. The location of the capacitor C indicates a midpoint of the primary side of the transformer T1. An output of the signal reception unit 8 is fed to an interface unit 9. The signal reception unit 8 is formed by a differential amplifier AP3. A description will be given of the circuit constructed above.

The signal for transmission is turned into a differential signal by the signal output unit 6 and output to line A and line B (subscriber lines) via the transformer T1. A dc component supplied by the power feed circuit 10 via the midpoint (location of the capacitor C) is superimposed on the signal for transmission.

The received signal is input to the operational amplifier AP3 of the signal reception unit 8 via the subscriber line and the transformer T1. The termination is determined by the wound resistance and the turn ratio of the transformer T1, and also by the value of the resistance R. Accordingly, the internal termination such as that in the analog subscriber circuit is not performed. In order to prevent oscillation of the signal output unit 6, the phase compensation circuit 7 having the characteristic indicated by curve f2 of FIG. 4 is coupled to the operational amplifiers AP1 and AP2 of the signal output unit 6.

FIG. 6 shows a construction of the subscriber circuit of the ping-pong system. In FIGS. 5 and 6, like numerals designate like elements. The ping-pong system is constructed such that transmission and reception are alternately repeated. The time-division multiplexed signal of $6V_{OP}$ and 160 kbs is transmitted and received, resulting in substantially transmitting and receiving a high-speed 320 kbs AMI signal.

Referring to FIG. 6, an interface/control unit 11 provides an interface and control of the signal. The amplifiers 3 and 4 amplifies the signal for transmission. The operational amplifiers AP1 and AP2 receive outputs from the amplifiers 3 and 4. The operational amplifiers AP1 and AP2 constitute the signal output unit 6. Unlike, the analog system and the 2B1Q system, phase compensation of the operational amplifiers is not provided.

A transformer T2 has a secondary side thereof connected between the operational amplifiers AP1 and AP2. The primary side of the transformer T2 is supplied with the dc component by the power feed circuit 10, with the ac component cut by the capacitor C.

A signal reception switching unit 12 connects the secondary side of the transformer T2 to the signal reception unit 8 when the signal is received. A control from the interface/control unit 11 controls the switch of the signal reception switching unit 12 so as cause it to be turned off when the signal is transmitted and turned on when the signal is received. A description will now be given of the operation of the circuit constructed as described above.

The circuit of FIG. 6 is constructed such that the signal reception switching unit 12 connects the received signal to the signal reception unit 8. When the signal is transmitted, the signal reception unit 8 is disconnected. Alternatively, in a transmission, the reception unit is configured not to receive the signal.

The signal for transmission is supplied via the output terminal OUT of the interface/control unit 11 to the signal output unit 6. The signal output unit 6 produces a differential signal accordingly and superimpose it on the dc component supplied by the power feed circuit 10 via the transformer T2. The superimposed signal is output to the subscriber lines (lines A and B).

The received signal arriving via the subscriber line is input to the differential amplifier AP3 of the signal reception unit 8 via the transformer T2 and the signal reception switching unit 12. The received signal is fed to the input terminal IN of the interface/control unit 11 via the amplifier AP3.

The termination is determined by the wound resistance and the turn ratio of the transformer T2, and the value of the resistance R. In this circuit, it is not necessary to provide a phase compensation circuit for the operational amplifiers AP1 and AP2 of the signal output unit 6. Phase compensation is not performed since the signal of an even higher speed is received than in the 2B1Q system.

The three systems described above are completely different in the circuitry. The difference derives mainly from the frequency of the output signal and how the termination is provided.

A first problem arises due to a difference in the phase compensation bandwidth used by the operational amplifier. In the analog system, sufficient phase compensation is necessary. In the 2B1Q system, the phase compensation must be controlled to a minimum level since the broadband is used than in the analog system. In the ping-pong system, a signal of an even higher speed is received so that the phase compensation circuit can not be provided. Accordingly, it has been difficult to implement the three systems in a single circuitry.

A second problem pertains to the speed of the operational amplifier. Phase compensation inherently restricts the broadband characteristic. In the 2B1Q system, a sufficient broadband characteristic need be ensured prior to phase compensation.

The operational amplifier operated on a high voltage of 48V is necessary. The transistors constituting the operational amplifier have a high withstand voltage and the size thereof is relatively large. Since a large transistor element has a parasite capacity ($C_{OP}$) and is not adapted for the high-frequency (broadband) range.

The following problems exist in a high-frequency operation.

In the high-frequency operation, small devices are necessary. This shows that only the transistor with a low withstand voltage can be used.

Secondly, a large current is to be introduced. This means that the resultant circuitry requires a relatively large power consumption.

Accordingly, it is difficult to produce operational amplifiers with a high withstand voltage and a broadband characteristic.

A description will be given of a background regarding a difference between a power feed circuit for the analog system and that for the digital system.

FIG. 7 shows an equivalent circuit of a power feed circuit for the analog system, illustrating a principle of an analog power feed circuit. A power feed circuit 1001 supplies an current, a subscriber line 1003 is connected to an output of the power feed circuit 1001, a load 1002 has an current flowing therein. A telephone set is used as the load 1002.

A series circuit formed by a resistance and an inductance is provided at an current exit and an current inlet of the power feed circuit 1001. L1 indicates an inductance, R1 indicates a resistance, L2 indicates an inductance, and R2 indicates a resistance. For example, the inductances L1, are on the order of several H, the resistances R1, R2 are on the order of 200 Ω. T1 indicates a sound coupling transformer for a call.

When the telephone set 1002 is set in a off-hook state in such a system, a loop is formed, so that a load current (output current) IL flows in the telephone set 1002. FIG. 8 shows a characteristic of the analog power feed circuit, assuming a voltage between the subscriber lines 1003 is Vab. In FIG. 8, the line voltage Vab is horizontally plotted and the output current IL is vertically plotted. As shown in FIG. 8, the analog power feed circuit provides constant-resistance power feed.

FIG. 9 illustrates a principle of a digital power feed circuit. In FIGS. 7 and 9, like numeral indicate like components. A load current IL provided by a power supply transformer T2 is caused to flow in a terminal unit (DSU) 1004 via the subscriber line 1003 and a choke coil L1 after being rectified by a diode D1. The terminal unit 1004 is connected to a terminal adapter (TA) 1005 which is connected to a terminal 1006 embodied by, for example, a telephone set. T indicates a coupling transformer.

FIG. 10 shows a characteristic of an output current IL of the circuit constructed in this way. In FIG. 10, a line voltage Vab is horizontally plotted, and an output current IL is vertically plotted. As is obviously learned from FIG. 10, the digital power feed circuit provides a constant-current characteristic. For example, a constant current of approximately 39 mA flows.

The analog power feed circuit is different from the digital power feed circuit in the characteristic required thereof. The analog power feed circuit provides constant-resistance power feed, and must provide a high impedance so that a sound does not leak out to a power supply unit at a sound frequency (100–4 kHz).

In contrast, the digital power feed circuit provides constant-current power feed, as shown in FIG. 10, and processes a digital signal of higher frequency than a signal of the analog system. In order to prevent the signal from migrating to a power supply unit, the digital power feed circuit must provide a high impedance. The digital system also adopts a floating power feed system in order to keep a proper ground balance.

Another difference between the analog system and the digital system resides in a signal transmission and reception circuit. In the digital system, transmission and reception of a signal is performed by a transformer. This is because a digital signal contains high-frequency components so that there are not any suitable signal transmission device other than a transformer.

Due to a characteristic inherent in a transformer, it is difficult to produce a transformer which can operate in a high frequency zone covering a range between a sound frequency band of the analog system and a several-MHz zone of the digital system. FIG. 11 is a graph showing a gain characteristic of an analog transformer and a digital transformer. A logarithm of the frequency is horizontally plotted, and a gain of a transformer is vertically plotted. f1 indicates a characteristic of the analog transformer, and f2 indicates a characteristics of the digital transformer. As shown in FIG. 11, there is no frequency area where a high gain zone of the transformers overlap.

Thus, the analog power feed circuit and the digital power feed circuit are totally different from each other so that it has been difficult to adapt the same circuit for both the analog system and the digital system. Installing both circuits and switching between the circuits is uneconomical since one of the circuits remains unused while the other is being used. Installing two circuits is also disadvantageous in that it causes the circuit scale to grow excessively.

Another aspect of the present invention concerns a switching power supply.

FIG. 12 shows a construction of a switching power supply circuit according to the related art. Referring to FIG. 12, the switching power supply circuit comprises a load 2001 connected between terminal A and terminal B of a power supply. In this example, the load 2001 is embodied by a telephone set. That is, the power supply circuit of FIG. 12 functions as a power feed circuit for the telephone set.

The power supply circuit of FIG. 12 also comprises a switching circuit 2002 for performing switching using a switching element embodied by a transistor TR. A primary winding L1 of a high-frequency transformer is connected as a collector load of the transistor TR. That is, a dc voltage VBB is applied to a series circuit formed by the primary winding L1 and the transistor TR.

The power supply circuit further comprises a secondary winding L2 of the high-frequency transformer, a rectifying diode D2 connected in series with the secondary winding L2, a choke coil L3 connected in series with the diode D2, and a diode D1 connected in parallel with the series circuit formed by the secondary winding L2 and the diode D2. The diode D1 is provided to form a loop when the energy stored in the choke coil L3 causes a current to flow in the load, when the diode D2 is switched off.

A capacitor C1 is connected between an end of the choke coil L3 and a common line. The capacitor C1 and the choke coil L3 forms a smoothing circuit. A high-frequency alternate current generated in the secondary winding of the transformer T responsive to the switching by the transistor TR is rectified. After being rectified, the current is smoothed by the smoothing circuit.

A current detection resistance R3 detects a current in the load 2001. An output current detection resistance 2003 receives a voltage generated across the resistance R3 and generates a signal Vdc commensurate with an output current. An error amplifier 2004 compares an output voltage Vdc of the current detection circuit 2003 and a reference voltage Vst and generates a signal commensurate with a difference thereof. The error amplifier 2004 is composed of a resistance R1 for receiving the voltage Vdc, an operational amplifier U1, a feedback resistance R2 connected between an input and an output of the operational amplifier U1, and a Capacitor C2 connected in parallel with the feedback resistance R2. The output voltage Vdc is fed to one of the inputs of the operational amplifier U1. The other input of the operational amplifier U1 is supplied with a reference voltage Vst.

A duty control circuit 2005 compares the output of the error amplifier 2004 and a sawtooth wave and generates a PWM pulse signal. The duty control circuit 2005 controls the switching transistor TR so as to vary an on-time thereof. A buffer 2006 is a driver circuit which receives the output of the duty control circuit 2005. The output of the buffer 2006 drives the switching transistor TR.

A description will be given of the operation of the circuit constructed in this way.

In a normal operation, the duty control circuit 2005 outputs the PWM signal of a constant duty ratio so as to switch the switching transistor TR. The dc voltage VBB is turned on/off at a constant duty ratio. The high-frequency alternate current is generated in the secondary side of the high-frequency transformer T. The generated high-frequency alternate current is rectified by the rectifying diode D2.

While the switching transistor TR is on, a current flows in a circuit connected to the secondary side of the high-frequency transformer T. That is, a current flow in a loop connecting the secondary coil L2, the diode D2, the choke coil L3, the resistance R3, the load 2001, the secondary coil L2. In this state, the capacitor C1 is charged. The smoothing circuit formed by the choke coil L3 and the capacitor C1 converts a dc ripple current into a flat dc voltage. When the switching transistor TR is off, the energy stored in the choke coil L3 causes a current to flow in a loop connecting the diode D1, the choke coil L3, the resistance R3, the load 2001, the diode D1. In this way, the load current (output current) Idc continually flows in the load 2001.

When the load current drops due to some cause, the error amplifier 2004 supplies a control signal to the duty control circuit 2005 so as to increase an on-time of the transistor TR. Conversely, when the load current increases for some reason, the error amplifier 2004 supplies a control signal to the duty control circuit 2005 to decrease an on-time of the transistor TR. With such PWM control, the load current Idc is controlled so as to be maintained at a constant level. That is, when the output drops, the output level of the error amplifier 2004 drops so that the duty control circuit 2005 outputs the PWM pulse having a duty ratio which causes the on-time to increase. When the output increases, the output level of the error amplifier 2004 increases so that the duty control circuit 2005 outputs the PWM pulse having a duty ratio which causes the on-time to decrease. In this way, the output is maintained at a constant level.

FIG. 13 is a flowchart showing the operation of the circuit according to the related art. The output current detection circuit 2003 detects the current Idc and outputs the voltage Vdc proportional to the current Idc (S1). The error amplifier 2004 is provided by the reference voltage generating unit with the voltage Vst corresponding to a target current (S2). The error amplifier 2004 feeds the voltage obtained by amplifying a difference voltage (error) between the detected voltage Vdc and the reference voltage Vst, to the duty control circuit 2005 (S3). The error amplifier 2004 forms an integrator (low-pass filter) so as to cause the output to vary gradually in the presence of an abrupt change in the level of Vdc.

The duty control circuit 2005 continually generates a sawtooth wave or a triangular wave, compares the output of the error amplifier 2004 with the sawtooth wave or the triangular wave, so as to generate a PWM clock (PWM pulse) (S4). Given the constant sawtooth wave, the duty of the PWM pulse (ratio of on-time of the transistor in a given period of time) changes due to increase and decrease of the dc level of the error amplifier 2004. Finally, the negative feedback circuit shown in FIG. 13 phases out to a state Vdc=Vst.

The driver circuit (the buffer 2006) drives the switching transistor TR of the switching circuit 2002 (DC/DC converter) in accordance with the output (logical level) of the duty control circuit 2005 (S5). A switching action causes the DC/DC converter 2002 to receive an electric energy from the dc voltage $V_{BB}$ so as to supply a predetermined dc current to the secondary side of the high-frequency transformer T (S6). By repeating steps S1–S6, it is possible to supply a desired current or voltage to the load 2001.

The switching power supply as described above is generally constructed to provide a necessary power supply at a fixed level (for example, +5V or +3.5V) derived from a predetermined main power supply (for example, AC100V or DC48V). The object of such a power supply unit is to provide a stable output efficiently. The requirement for a variable output only arises from a need to fine-tuning the power supply.

For example, the function for supplying a power to a terminal in a subscriber circuit requires is known as power feed. A power feed circuit is a type of power supply characterized by a small power output of approximately 2W. The power feed circuit is required to exercise complex control for switching from a constant current to a constant voltage depending on a line resistance. Such a requirement is absent in the conventional switching power supply. The technology for a switching power supply begins to be required in the subscriber circuit for the purpose of saving power.

SUMMARY OF THE INVENTION

Accordingly, an object of the present invention is to provide a subscriber circuit in which the aforementioned problems are eliminated.

Another and more specific object of the present invention is to provide a subscriber circuit which can be used in the three systems.

Still another object of the present invention is to provide a subscriber circuit in which an operational amplifier with a high withstand voltage and a broadband characteristic is provided.

FIG. 14 is a block diagram showing a principle of the present invention. In FIGS. 2 and 14, like numerals represent like elements. The circuit of FIG. 14 implements the analog system, the 2B1Q system and the ping-pong system.

Referring to FIG. 14, a switching control unit 20 controls transmission and reception and also controls a switch provided in each component of the subscriber unit. The switching control unit 20 is connected to the highway (HW) and the subscriber circuit. A feedback circuit 2A is connected between an output terminal A-OUT and an input terminal A-IN of the switching control unit 20. The feedback circuit 2A is provided with a switch for connecting and disconnecting the feedback circuit from the other components in response to a switch signal from the switching control unit 20.

An amplifier 3 amplifiers a signal transmission from the switching control unit 20. An amplifier 4 inverts and amplifies a signal for transmission from the switching control unit 20. A bias unit 30 provides a dc bias to the signal for transmission in response to the output from the amplifiers 3 and 4. The bias unit 30 consists of an amplifier with a high withstand voltage and a narrowband characteristic.

A signal output unit 40 receives an output form the bias unit 30 and outputs a signal for transmission to line A and line B. The signal output unit 40 is provided with two operational amplifiers for line A and line B with a low withstand voltage and a broadband characteristic for. Phase compensation for the operational amplifiers is variable in accordance with a switch signal from the switching control unit 20. More specifically, the capacitance of the capacitor for phase compensation is changed. The bias unit 30 and the signal output unit 40 constitute a signal processing unit. That is, the signal processing unit is divided into the bias unit 30 and the signal output unit 40.

A signal reception unit 8 receives a signal from line A and line B. The output of the signal reception unit 8 is fed to the A-IN terminal of the switching control unit 20.

According to the construction of the present invention described above, the switching control unit 20 disconnects and connects the feedback circuit appropriately and variably controls phase compensation in the signal output unit 40. Thus, the subscriber unit adapted for the analog system, the 2B1Q system and the ping-pong system is provided.

FIG. 18 is a block diagram showing a principle of a power feed circuit according to the present invention. In a figure, a DC/DC converter 1020 switches between a primary side dc voltage E so as to provide a dc voltage on the secondary side. Electronic choke circuits 1011, 1012 for a sound signal block are connected in series with an output subscriber line of the DC/DC converter 1020. Choke coils L10, L11 for a digital signal block are connected in series with the output subscriber line. The electronic choke circuits 1011, 1012 are block circuits for an analog sound signal, and the choke coils L10, L11 are block circuits for a digital sound signal.

Numerals 1013 and 1014 indicate subscriber lines, 1015 indicates a voltage/current detection circuit, and 1050 indicates a controller which, upon receipt of an output of the voltage/current detection circuit 1015, controls the DC/DC converter 1020 so as to provide a voltage drop commensurate with a power feed resistance.

Since the circuit as described above is divided into blocks so as to ensure that the analog sound signal does not leak out to a power supply unit, using the electronic choke circuits 1011, 1012, and the digital sound signal does not leak to the power supply unit, using the choke coils L10, L11, the analog system and the digital system can be implemented by the same circuit.

A switch is provided across the secondary side of the DC/DC converter 1020. When the switch is closed, a predetermined voltage is generated across the secondary side. When the switch is open, the secondary side is placed in a floating state.

According to the construction of FIG. 18, the primary side and the secondary side of the DC/DC converter 1020 are placed at a fixed potential when the analog sound is processed, and the secondary side is placed in a floating state when the digital sound is processed.

The switch is characterized in that the mid-point potential of the floating power feed unit is fixed to a specific potential when the fixed potential is selected.

According to the construction of this invention, by placing the center potential of the floating power feed unit at a specific fixed potential, for example at −24 V, setting of the fixed potential for the analog sound becomes possible.

The controller 1050 detects or determines by computation a voltage drop commensurate with a power feed resistance, produces a pulse width modulation signal related to a difference from a current loop current, with a current commensurate with this voltage drop as a target, so as to control the DC/DC converter.

The controller 1050 described above computes an output current or determines the same upon receipt of the output of the voltage/current detection circuit 1015, varies a drive pulse width of the DC/DC converter so as to be equal to the target value, so that the output current is maintained at a constant level.

The controller 1050 detects or determines by computation a voltage drop commensurate with a power feed resistance, produces a value related to a difference from a current loop current, with a current commensurate with this voltage drop as a target. A counter operated on a pulse width having the produced value generates a pulse width modulation signal.

The controller 1050 described above computes an output current or determines the same upon receipt of the output of the voltage/current detection circuit 1015, counts the clock so that the output current is equal to a target value, drives the DC/DC converter with a pulse width of the output of the counter. Thus, the output current is maintained at a constant level.

A storage means related to the period of the output pulse mentioned above is provided. The frequency of the pulse width modulation signal is varied, by counting time periodically based on a value stored in the storage means.

Based on the value stored in the storage means, time is counted periodically so as to vary the frequency of the pulse phase modulation signal. Thus, the efficiency characteristic and the noise characteristic can be regulated.

When a transformer for an analog signal is connected with a transformer for a digital signal so that the circuit is used as an analog subscriber circuit, two transformers are connected in series. When the circuit is used as a digital subscriber circuit, the transformer for the analog signal is short-circuited.

According to the construction of this invention, a signal coupling transformer can be used both in an analog signal mode and in a digital signal mode, by selectively using the analog signal transformer and the digital signal transformer connected in series.

FIG. 30 is a block diagram showing a principle of the switching power supply according to the present invention. In FIGS. 30 and 12, like numerals represent like components. Referring to FIG. 30, the switching power supply comprises a load 2001; a switching circuit 2002 (for example, a DC/DC converter) for supplying a current or a voltage to the load 2001; a detection resistance R3 for detecting a power supplied from the switching circuit 2002 to the load 2001, an output current detection circuit 2003 which receives an output of the detection resistance R3 to detect an output current from the switching circuit 2002; an A/D converter 2010 which receives an output Vdc of the output current detection circuit 2003 and converts the same into a digital signal. The switching circuit 2002 includes a switching element TR for switching a dc voltage $V_{BB}$. For example, a transistor is used to implement the switching circuit element.

A determination circuit 2011 compares an output Ddc of the A/D converter 2010 and a reference value Dst, and outputs a result of comparison. A register 2013 retains the reference value Dst. A duty control circuit 2012 controls a duty of a PWM signal input to the switching circuit 2002 so that the output current or the output voltage is maintained at a constant level. In the present invention, all the elements constituting the switching power supply are digital elements. A driver circuit 2006 receives an output of the duty control circuit 2002 and drives the switching circuit 2002.

According to this construction, since the elements constituting the switching power supply are digital elements, the output thereof can be controlled instantly and flexibly using digital information or software.

The duty controls receives an input of a high-speed clock so as to generate a periodical clock of a necessary PWM signal. When the pulse width of the PWM signal is to be changed, the duty control circuit effects control, with a minimum variable range equal to the width of one pulse of the clock.

According to such a construction, the output can be varied with a minimum unit of one pulse of the high-speed clock.

The determination circuit compares the output of the detection unit and the reference value, and provides a control signal so as to provide the following operation.

When the output of the detection unit is smaller than the reference value, the pulse width is increased. When the output of the detection unit is equal to the reference value, the pulse width is maintained. When the output of the detection unit is greater than the reference value, the pulse width is decreased.

In this way, it is possible to digitally compare the output of -the power supply unit with the reference value so that the output is stabilized by a negative feedback for ensuring, depending on the result of comparison, that the output of the power supply circuit is equal to the reference value.

In controlling the PWM signal, there is no limit to the degree of increase or decrease in the pulse width at a constant state. The pulse width is randomly increased or decreased.

With this construction, the output of the switching power supply can be maintained at a constant level using a simple construction of a duty control circuit.

In controlling the PWM signal, there may be provided a certain limit (in the form of a pattern) to the degree of increase or decrease in the pulse width at a constant state. After performing duty control for a certain period of time using such a pattern, a new patter is selected which causes the output of the switching circuit to be increased or decreased depending on the result of determination by the determination circuit.

By providing several PWM patterns for driving the switching circuit, and by selecting one of the PWM patterns depending on the output, the switching power supply in which low-frequency noise in the power feed unit is suppressed is realized.

In case the output load changes abruptly in controlling the PWM signal, requiring a significant change in the pulse width of the switching element, the width of the duty pulse is changed to a great extent so as to extend several clock pulses.

According to the construction described above, it is possible to adapt for an abrupt change in the output load.

The duty control pattern may be maintained in the form of pattern data stored in a memory. The pattern data is read out in duty control. The pulse width of the PWM signal is controlled in accordance with the pattern data.

According to the construction described above, the PWM pattern is easily generated by storing the pattern data having a certain limit to an increase or decrease in a memory.

BRIEF DESCRIPTION OF THE DRAWINGS

Other objects and further features of the present invention will be apparent from the following detailed description when read in conjunction with the accompanying drawings, in which:

FIG. 35 shows an operating logic of a determination circuit;

DETAILED DESCRIPTION OF THE PREFERRED EMBODIMENTS

Figures 1, 2:
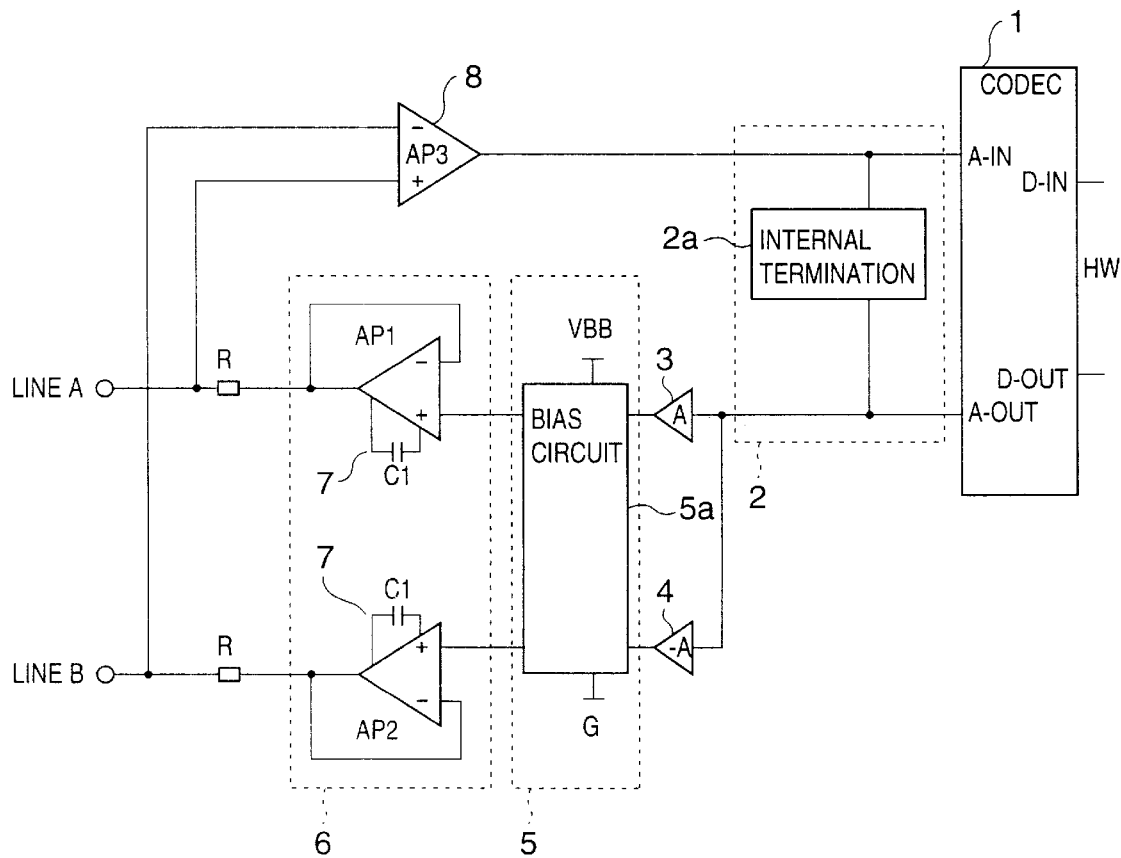
FIG. 1 is a table comparing an analog subscriber circuit, a digital subscriber circuit using the 2B1Q system and a digital subscriber circuit using the ping-pong system.
FIG. 2 shows a construction of an analog subscriber circuit according to the related art.
Figure 3:
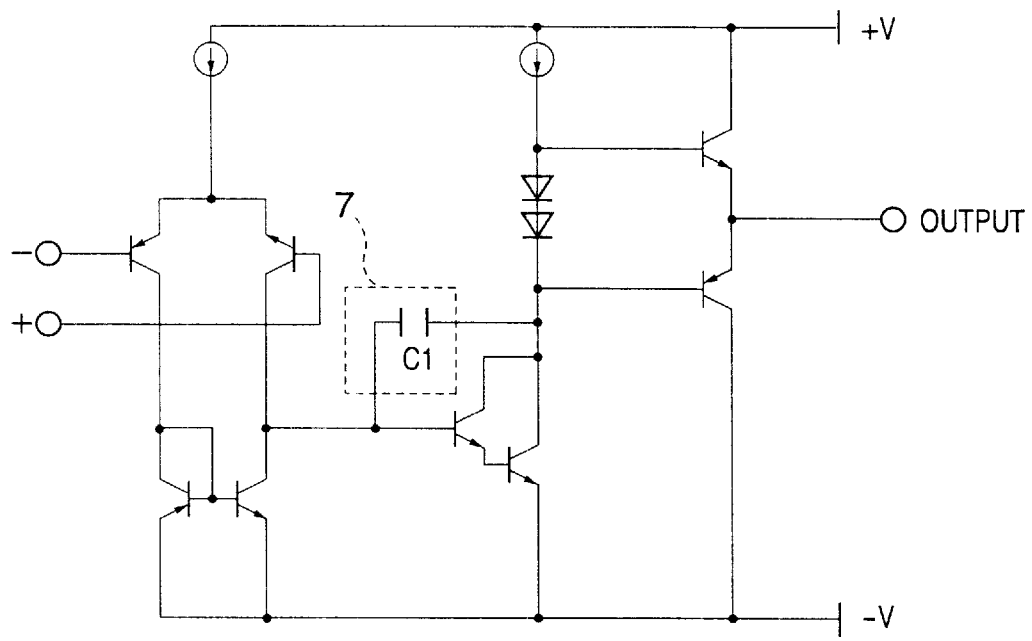
FIG. 3 shows a construction of an operational amplifier.
Figure 15:
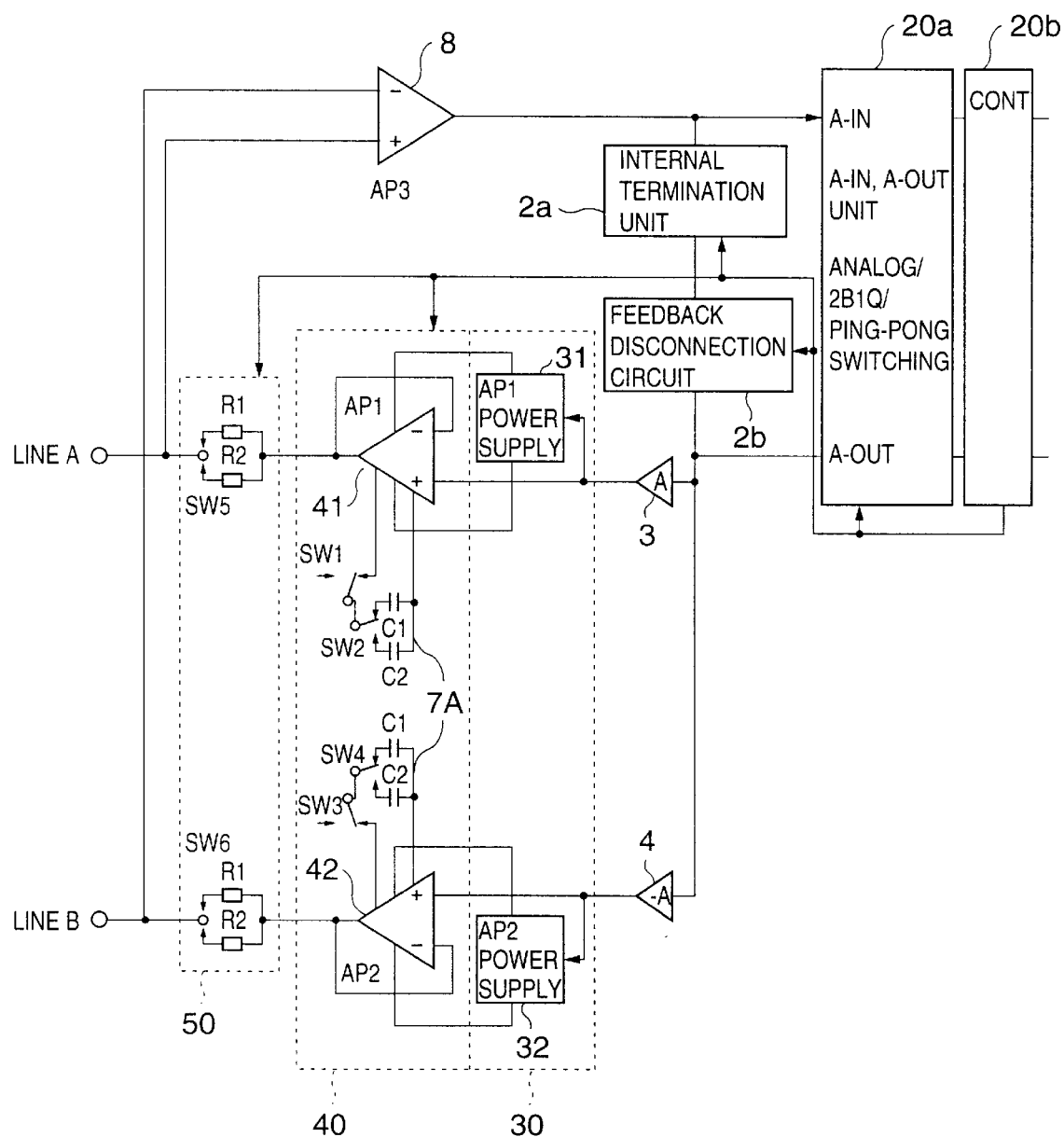
FIG. 15 is a block diagram showing a subscriber circuit according to an embodiment of the present invention.

FIG. 15 is a block diagram showing a subscriber circuit according to an embodiment of the present invention. In FIGS. 2 and 15, like numerals represent like elements. The circuit of FIG. 15 implements the analog system, the 2B1Q system and the ping-pong system.

Referring to FIG. 15, a switching unit 20a switches between different modes of an internal signal processing circuit depending on whether the analog system, the 2B1Q system or the ping-pong system is used. A control unit 20b supplies a switching signal to respective circuits depending on whether the analog system, the 2B1Q system or the ping-pong system is used. The switching unit 20a outputs a signal for transmission from an output terminal A-OUT and is supplied with a received signal at an input terminal A-IN. The switching unit 20a and the control unit 20b constitute a switching control unit 20.

Figure 14:
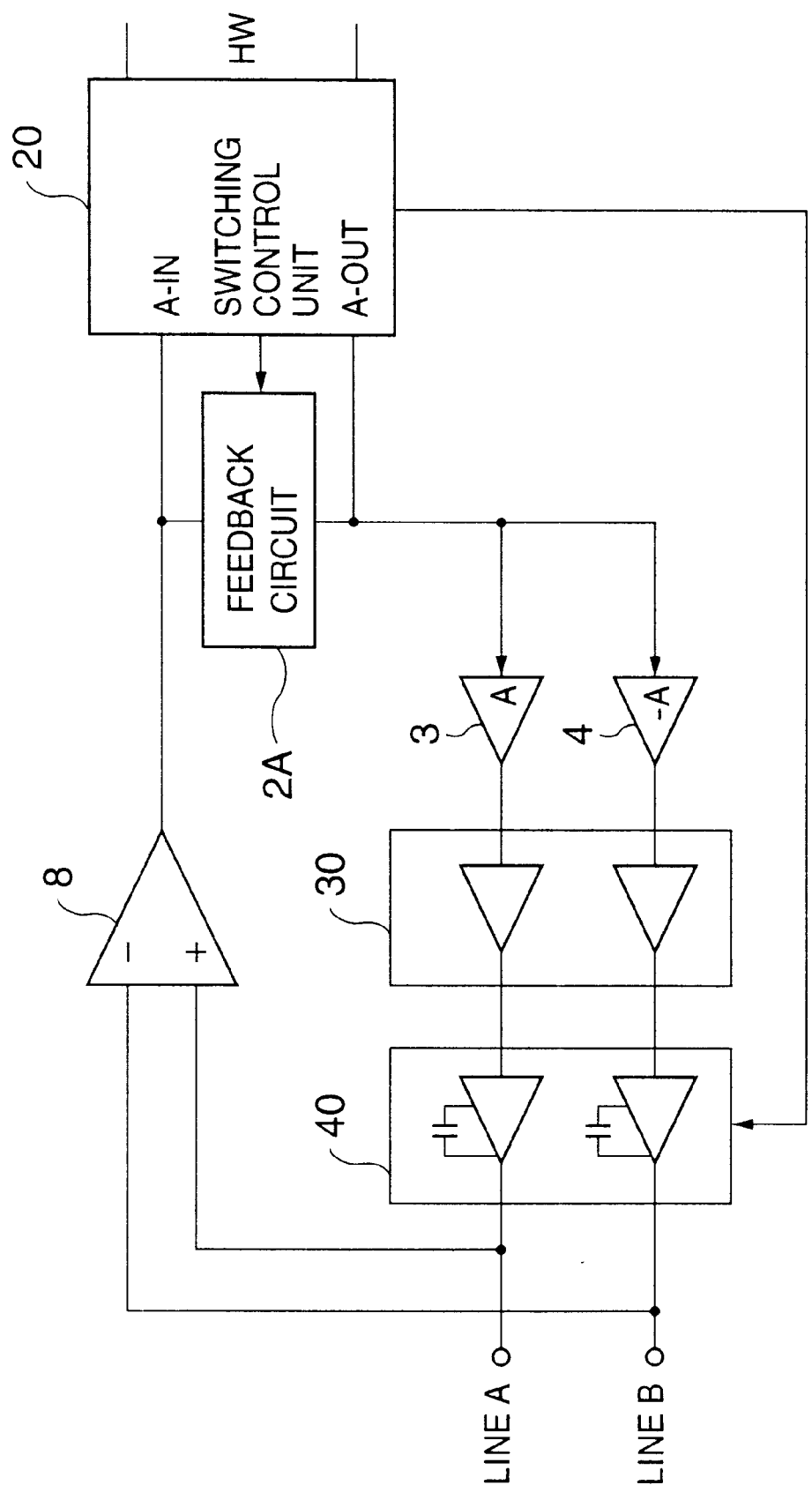
FIG. 14 is a block diagram showing a principle of a subscriber circuit according to the present invention.

An internal termination unit 2a is connected between the input terminal A-IN and the output terminal A-OUT. A feedback disconnection circuit 2b is connected in series with the internal termination unit 2a and connects or disconnects a feedback circuit. The internal termination circuit 2a and the feedback disconnection circuit 2b constitute the feedback circuit 2A of FIG. 14.

An amplifier 3 amplifies a signal for transmission, and an amplifier 4 performs an inverted amplification of a signal for transmission. A bias unit 30 receives outputs from the amplifiers 3 and 4. The bias unit 30 comprises a first power supply (AP1 power supply) 31 for receiving the output of the amplifier 3 and a second power supply (AP2 power supply) 32 for receiving the output of the amplifier 4.

The signal output unit 40 comprises a first operational amplifier AP1 for receiving the output of the amplifier 3 and outputting a signal to line A, a second operational amplifier AP2 for receiving the output of the amplifier 4 and outputting a signal to line B, and a phase compensation circuit 7A for the operational amplifiers AP1 and AP2. The output of the amplifier 3 is fed to the input of the operational amplifier AP1. The output of the amplifier 4 is fed to the input of the operational amplifier AP2. The output of the AP1 power supply 31 is used as a voltage for driving the operational amplifier AP1. The output of the AP2 power supply 32 is used as a voltage for driving the operational amplifier AP2.

In the operational amplifier AP1, one of phase compensation terminals leading from the operational amplifier AP1 is connected to phase compensation capacitors C1 and C2. The other terminal is connected to switches SW1 and SW2. The switch SW2 selects the capacitor C1 or the capacitor C2. The switch SW1i connects or disconnects the other terminal of the selected capacitor to the other phase compensation terminal of the operational amplifier AP1.

In the operational amplifier AP2, one of phase compensation terminals leading from the operational amplifier AP2 is connected to phase compensation capacitors C1 and C2. The other terminal is connected to switches SW3 and SW4. The switch SW4 selects the capacitor C1 or the capacitor C2. The switch SW3 connects or disconnects the other terminal of the selected capacitor to the other phase compensation terminal of the operational amplifier AP2.

An external termination unit 50 receives outputs from the operational amplifiers AP1 and AP2. The external termination unit 50 comprises resistors R1 and R2 connected in parallel, switches SW5 and SW6 for switching between the resistors R1 and R2. The output of the operational amplifier AP1 is connected to line A via the external termination resistor R1 or R2. Likely, the output of the operational amplifier AP2 is connected to line B via the external termination resistor R1 or R2. The resistor R1 is selected in the analog system and the resistor R2 is selected in the 2B1Q system and in the ping-pong system.

As shown in FIG. 1, the termination resistance in the 2B1Q system is 135 Ω and the termination resistance in the ping-pong system is 110 Ω. Accordingly, by providing the termination resistance of 123 Ω, which is an average of the two value. In this way, the external termination resistance can be shared by the 2B1Q system and the ping-pong system if with a slight error.

The signal reception unit 8 for receiving received signals from line A and line B is embodied by, for example, a differential amplifier. The output of the signal reception unit is connected to the input terminal A-IN of the switching unit 20a.

A description will now be given of the circuit constructed as above.

The control unit 20b switches between different modes of signal input to and output from the input terminal A-IN and the output terminal A-OUT, respectively, of the switching unit 20a. The control unit 20b also controls disconnection of a feedback route, disconnection of the internal termination resistance, switching of the external termination unit, and switching of the phase compensation circuit.

A description will be given of the operation of the circuit of FIG. 15 in the analog system.

The control unit 20b supplies a control signal to the switching unit 20a so as to set the mode of the signals input to and output from the input terminal A-IN and the output terminal A-OUT, respectively, to the analog system. The control unit 20b also supplies a control signal to the feedback disconnection circuit 2b so that the internal resistance unit 2a is connected to the feedback circuit. The control unit 20b also supplies a switching signal to the switches SW5 and SW6 connected to line A and line B, respectively, so that the external resistance R1 is used. Thus, the 600 Ω termination is implemented as a total of the external termination resistance R1 and the internal termination resistance.

Figure 4:
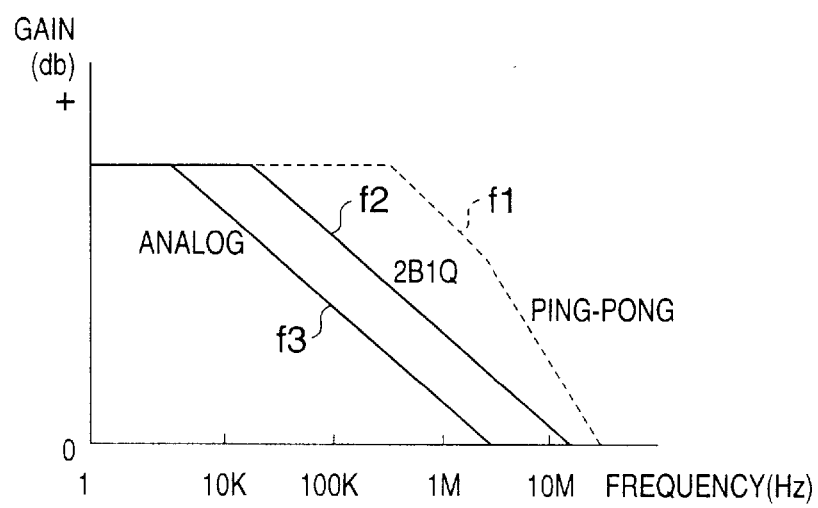
FIG. 4 is a graph showing a gain-frequency characteristic of an operational amplifier used in a subscriber circuit.
Figure 5:
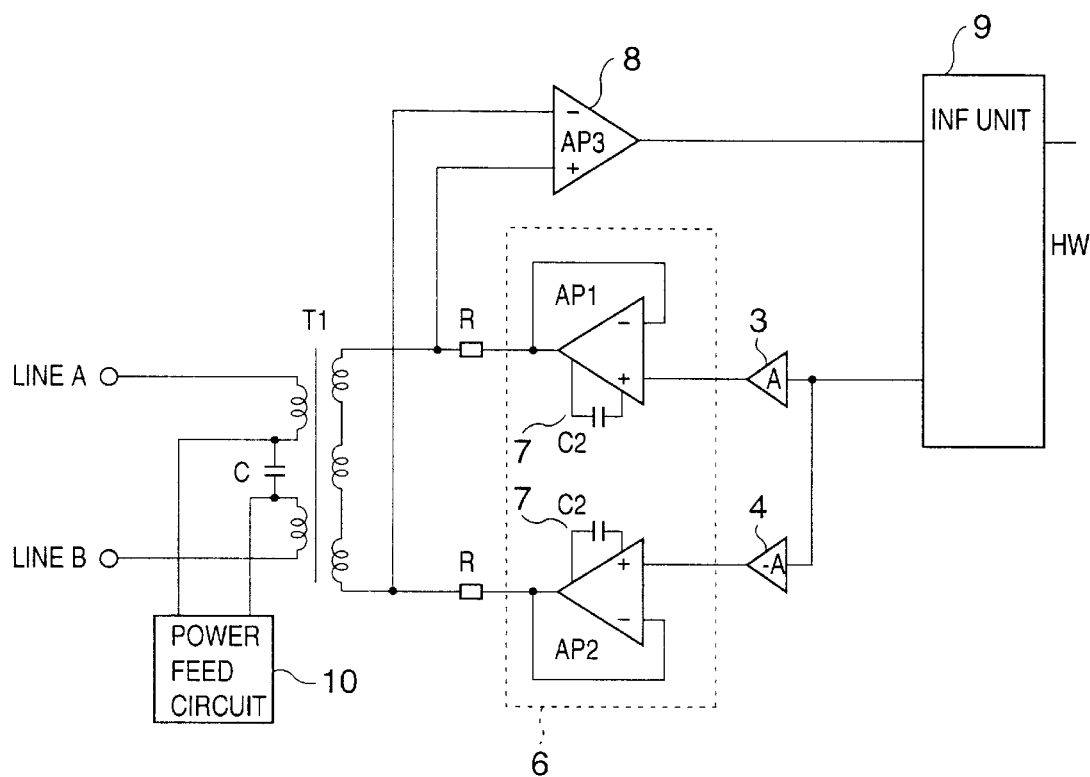
FIG. 5 shows a construction of a conventional subscriber circuit for the 2B1Q system.
Figure 6:
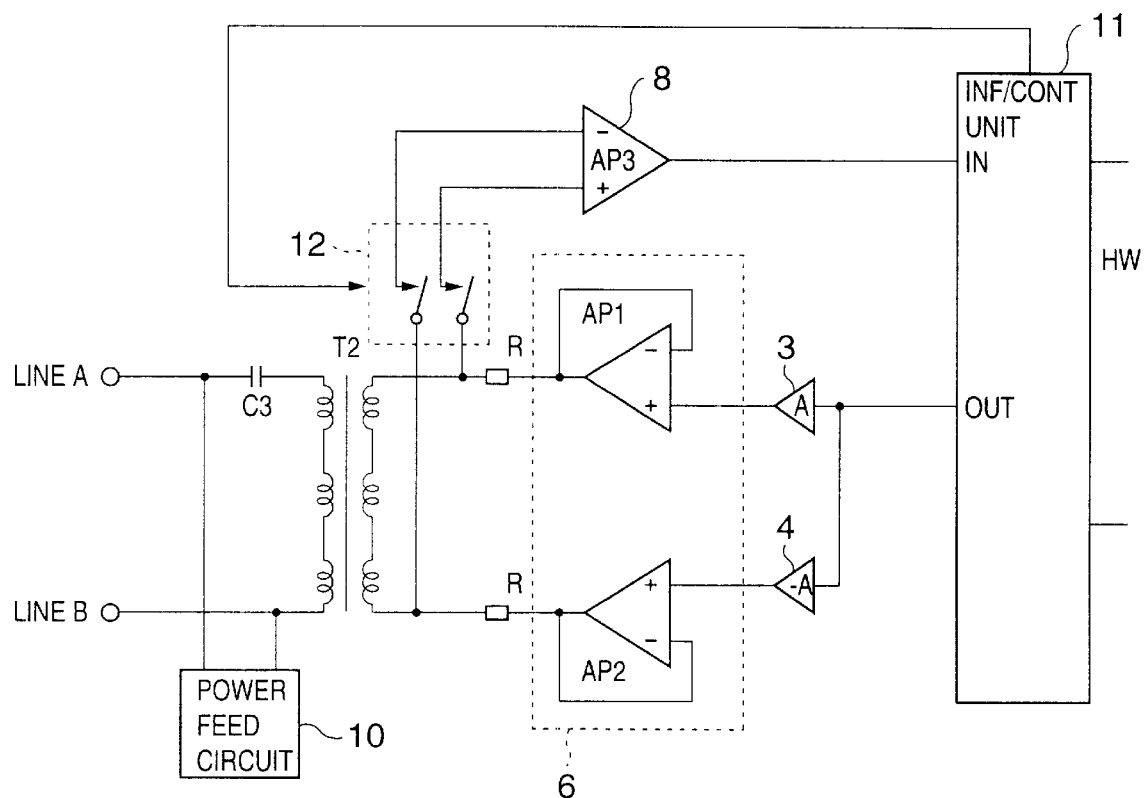
FIG. 6 shows a construction of a subscriber circuit for the ping-pong system.
Figure 7:
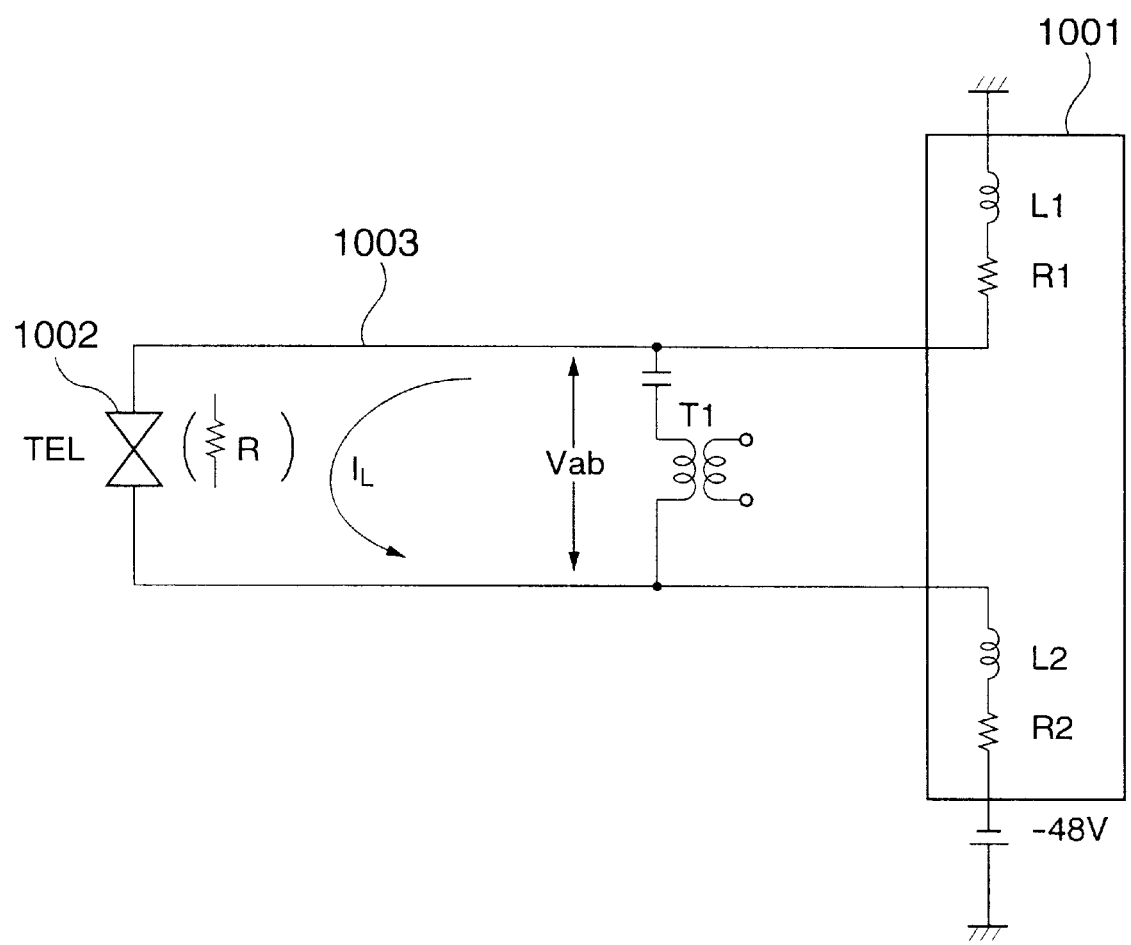
FIG. 7 shows an equivalent circuit of a power feed circuit for the analog system.
Figure 8:
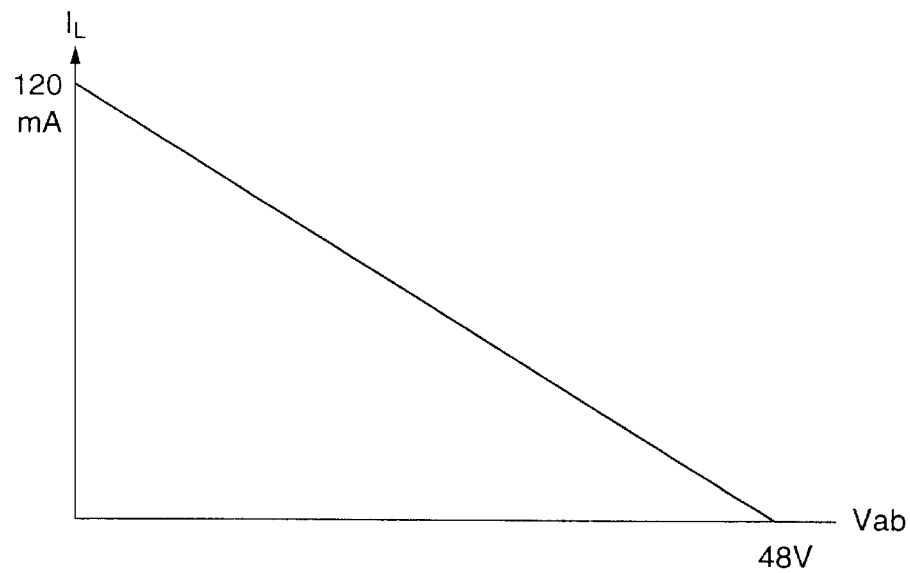
FIG. 8 shows a characteristic of the analog power feed circuit.
Figure 9:
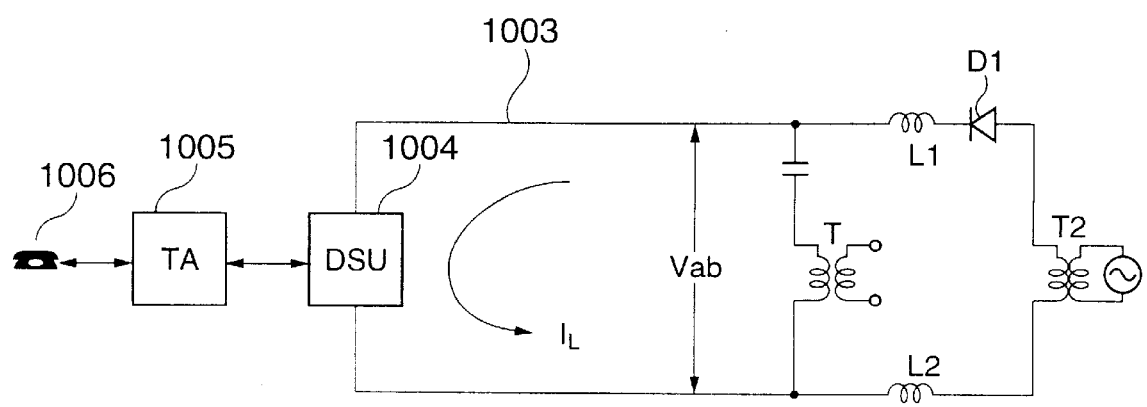
FIG. 9 illustrates a principle of a digital power feed circuit.
Figure 10:
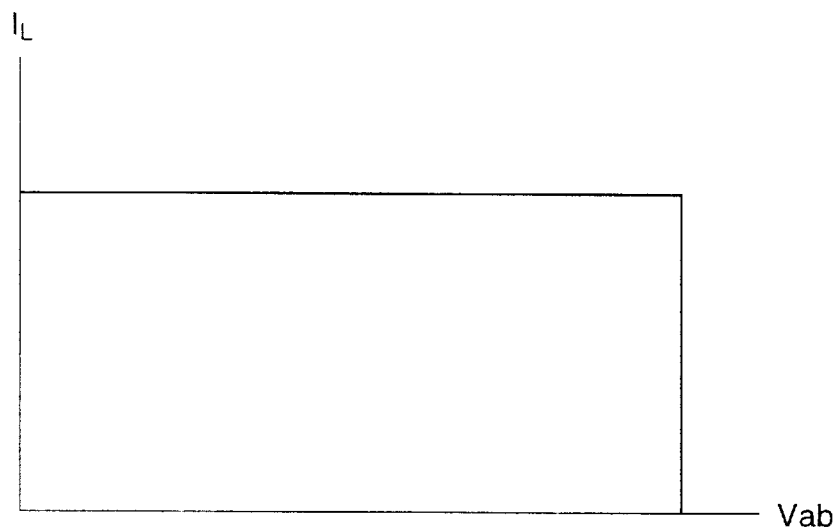
FIG. 10 shows a characteristic of an output current.
Figure 11:
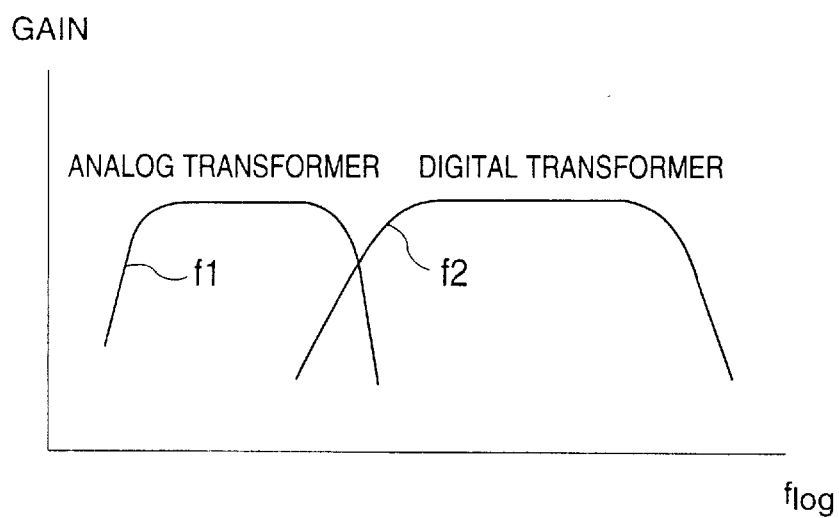
FIG. 11 is a graph showing a gain characteristic of an analog transformer and a digital transformer.
Figure 12:
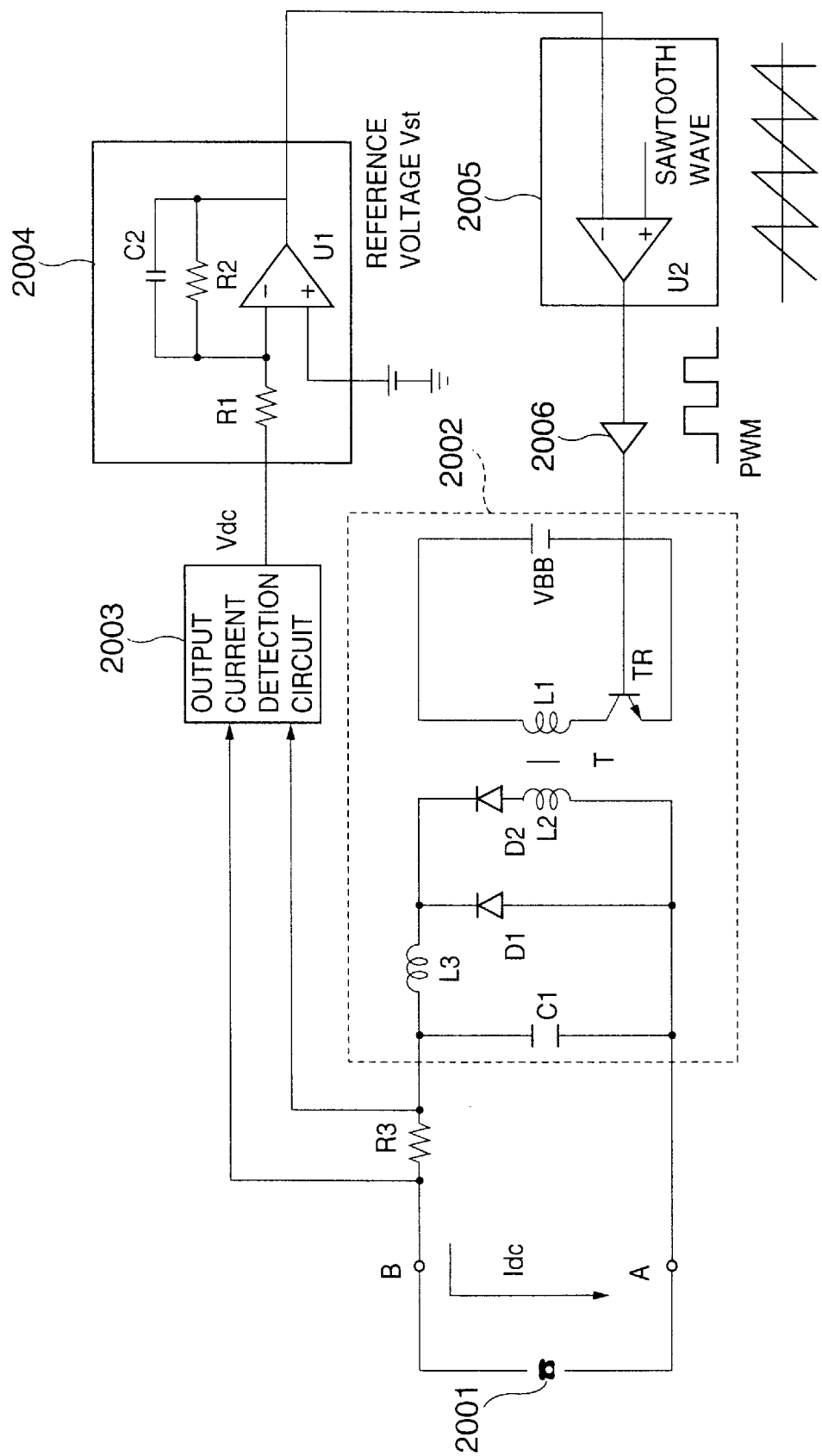
FIG. 12 shows a construction of a switching power supply circuit according to the related art.
Figure 13:
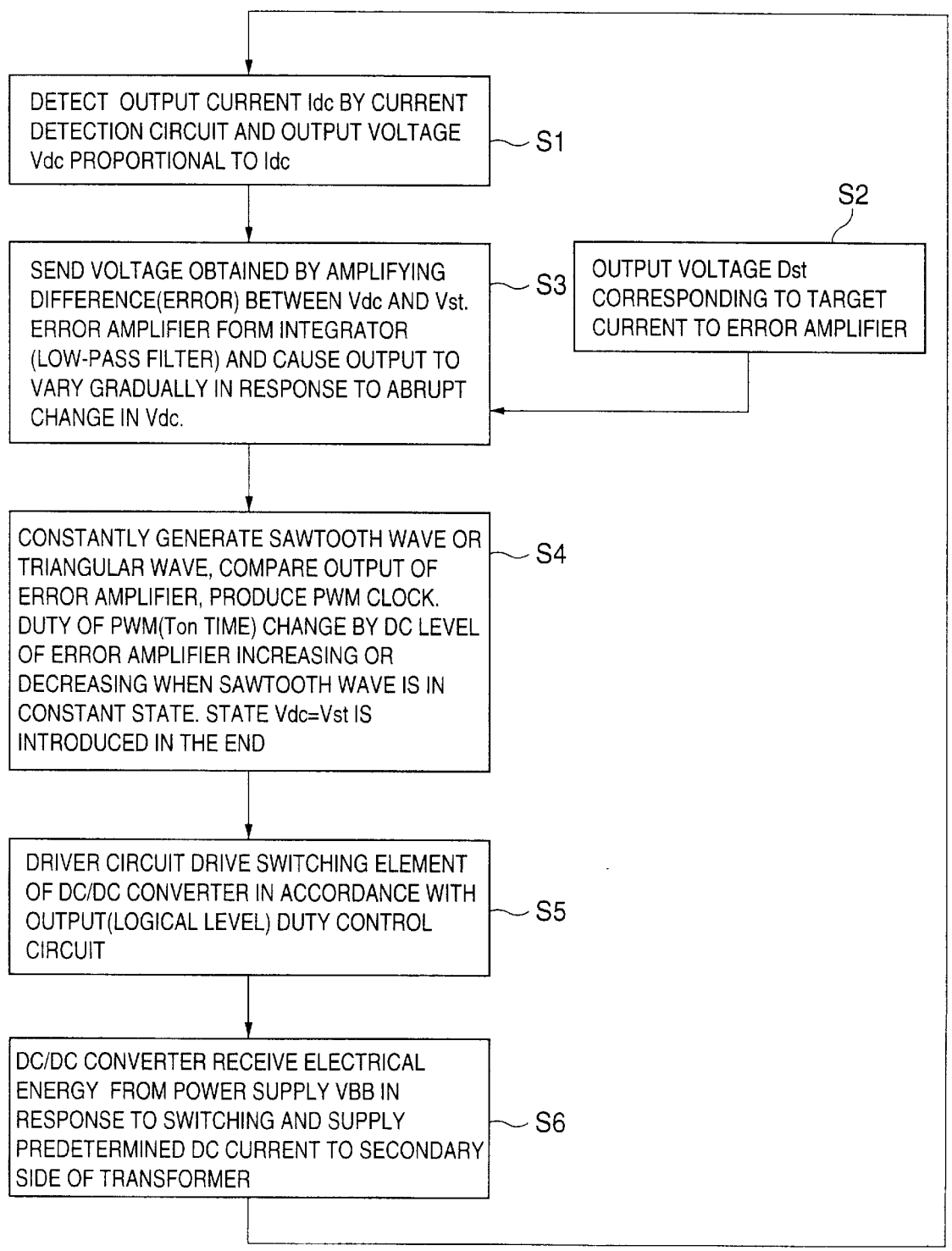
FIG. 13 is a flowchart showing the operation of the circuit according to the related art.

The phase compensation circuit for the operational amplifiers AP1 and AP2 of the signal output unit 40 is set as follows. The switch SW1 connects the phase compensation circuit 7A to the phase compensation terminal of the operational amplifier AP1, and switch SW2 is connected to the capacitor C2. The switch SW3 connects the phase compensation circuit 7A to the phase compensation terminal of the operational amplifier AP2, and the switch SW4 is connected to the capacitor C1. The operational amplifiers AP1 and AP2 are provided with sufficient phase compensation, resulting in a characteristic f3 as shown in FIG. 4.

The bias unit 30 and the signal output unit 40 are separate. The bias unit 30 causes the AP1 power supply 31 to be supplied to the operational amplifier AP1 as an operating voltage, and causes the AP2 power supply 32 to the operational amplifier AP2 as an operating voltage, so that the operational amplifiers AP1 and AP2 operate in a low voltage resistance and in a broadband.

Figure 16:
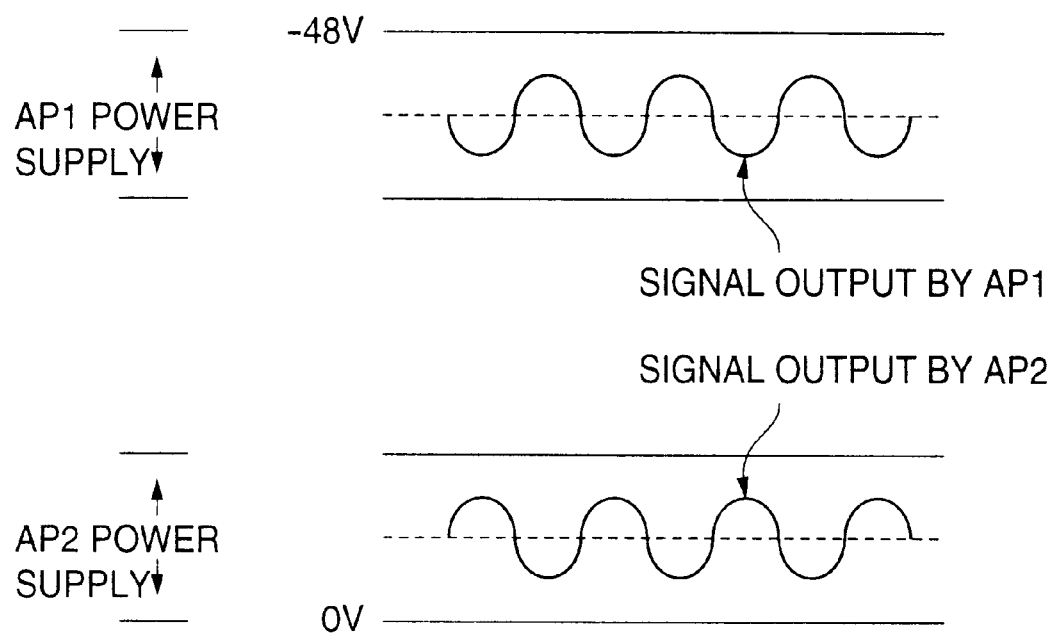
FIG. 16 shows a relation between power supply AP1 and power supply AP2.

FIG. 16 shows a relation between power supply AP1i and power supply AP2, and the respective operational amplifiers. The AP1 power supply has a range defined by −48V and provides a voltage having a waveform as shown. The AP2 power supply has a range defined by 0V and provides a voltage having a waveform as shown.

A description will be given of the operation of the circuit of FIG. 15 in the 2B1Q system.

The control unit 20b supplies a control signal to the switching unit 20a so as to set the mode of the signals input to and output from the input terminal A-IN and the output terminal A-OUT, respectively, to the 2B1Q system. The control unit 20b also supplies a control signal to the feedback disconnection circuit 2b so as to disconnect the internal termination resistance 2a. Thus, the feedback circuit is removed so that the circuit becomes an open loop.

The control unit 20b supplies switching signals to the switches SW5 and SW6 so that the external termination resistance R2 is used. The value of the resistance of the external resistance R2 is set to half of the termination resistance. Thereby, a termination of 123 Ω, which is close to 135 Ω, is provided.

The phase compensation circuit for the operational amplifiers AP1 and AP2 of the signal output unit 40 is set as follows. The switch SW1 connects the phase compensation circuit 7A to the phase compensation terminal of the operational amplifier AP1, and switch SW2 is connected to the capacitor C2. The switch SW3 connects the phase compensation circuit 7A to the phase compensation terminal of the operational amplifier AP2, and the switch SW4 is connected to the capacitor C2. The operational amplifiers AP1 and AP2 are provided with sufficient phase compensation, resulting in a characteristic f2 as shown in FIG. 4.

The bias unit 30 and the signal output unit 40 are separate. The bias unit 30 causes the AP1 power supply 31 to be supplied to the operational amplifier AP1 as an operating voltage, and causes the AP2 power supply 32 to the operational amplifier AP2 as an operating voltage, so that the operational amplifiers AP1 and AP2 operate in a low voltage resistance and in a broadband.

A description will be given of the operation of the circuit of FIG. 15 in the ping-pong system.

The control unit 20b supplies a control signal to the switching unit 20a so as to set the mode of the signals input to and output from the input terminal A-IN and the output terminal A-OUT, respectively, to the ping-pong system. The control unit 20b also supplies a control signal to the feedback disconnection 2b so as to disconnect the internal termination unit 2a. Thus, the feedback circuit is removed so that the circuit becomes an open loop.

The control unit 20b supplies switching signals to the switches SW5 and SW6 so that the external termination resistance R2 is used. The value of the resistance of the external resistance R2 is set to half of the termination resistance. Thereby, a termination of 123 Ω, which is close to 110 Ω, is provided.

The control unit 20b switches the switches SW1 and SW3 to the other side in order to disconnect the phase compensation circuit for the operational amplifiers AP1 and AP2. Thus, the phase compensation circuits are disconnected from the respective operational amplifiers. The characteristic of the operational amplifiers is indicated by curve f1 of FIG. 4.

The bias unit 30 and the signal output unit 40 are separate. The bias unit 30 causes the AP1 power supply 31 to be supplied to the operational amplifier AP1 as an operating voltage, and causes the AP2 power supply 32 to the operational amplifier AP2 as an operating voltage, so that the operational amplifiers AP1 and AP2 operate in a low voltage resistance and in a broadband.

According to the first embodiment, the switching control unit 20 controls connection and disconnection of the feedback circuit and controls phase compensation of the signal output unit 40. In this way, the subscriber circuit adapted for the analog system, the 2B1Q system and the ping-pong system is implemented.

By separating the signal output unit 40 and the bias unit 30, by configuring the operational amplifiers constituting the signal output unit 40 to operate in a low voltage resistance and in a broadband, and by configuring the operational amplifiers in the bias unit 30 to operate in a high withstand voltage and in a narrow band, the subscriber circuit is realized in which operational amplifiers with a high withstand voltage and operational amplifiers with a broadband characteristic are used.

By connecting or disconnecting a phase compensation circuit for the amplifiers of the signal output unit 40, the subscriber circuit can be adapted for the analog system, the 2B1Q system and the ping-pong system.

By connecting the feedback circuit connecting the signal reception unit 8 and the signal output unit 40, in the analog system, and disconnecting the same in the 2B1Q system and the ping-pong system, the subscriber circuit is adapted for the analog system, the 2B1Q system and the ping-pong system.

By switching between external termination resistances depending on whether the analog system, the 2B1Q system or the ping-pong system is used, the termination most adapted for the system used is implemented.

By controlling the value of the external termination resistance to be in the middle of the value for the ping-pong system and the value for the 2B1Q system, and by switching between the internal termination resistance for the analog system and the external termination resistance, it is possible to share the external termination in the 2B1Q system and the ping-pong system.

Figure 17:
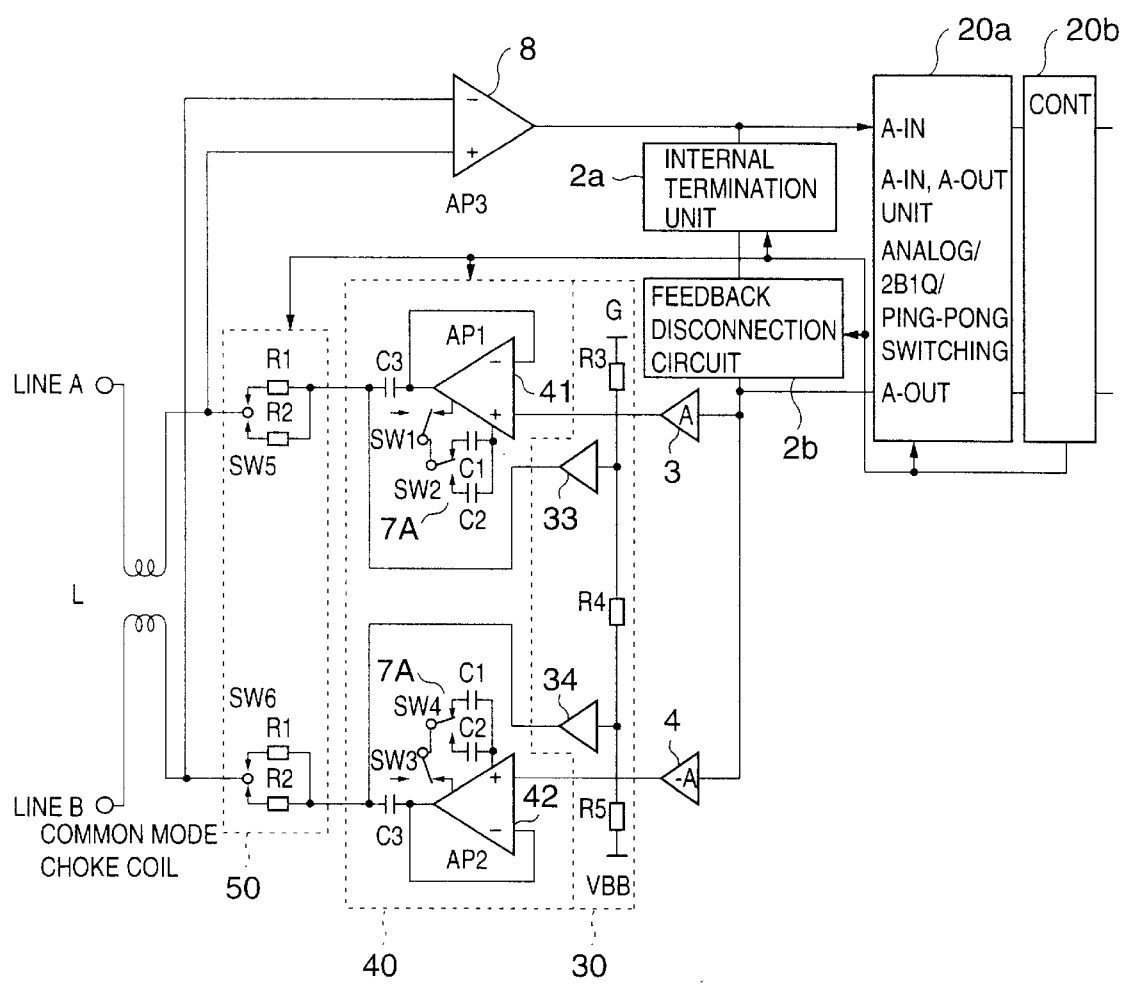
FIG. 17 is a circuit diagram showing the circuit according to another embodiment of the present invention.

FIG. 17 is a circuit diagram showing the circuit according to another embodiment of the present invention. In FIGS. 15 and 17, like numerals represent like components. The circuit of FIG. 17 differs from the circuit of FIG. 15 in the constitution of the bias unit 30 and in that a common mode choke coil L is provided between Line A and line B, the other aspects of the circuit of FIG. 17 being identical to the corresponding aspects of the circuit of FIG. 15.

In the bias unit 30, bias setting resistances R3, R4 and R5 are connected between the ground and a −48V power supply ($V_{BB}$). The potential at a junction between the resistances R3 and R4 is connected to the output of the operational amplifier AP2 via an operational amplifier 33 so as to supply a dc bias potential. The potential at a junction between the resistances R4 and R5 is connected to the output of the operational amplifier AP2 via an operational amplifier 34 so as to provide a dc bias potential. In the second embodiment, the outputs of the operational amplifiers AP1 and AP2 are provided via a dc cut capacitor C3.

A description will be given of the operation of the circuit of FIG. 17.

The control unit 20b supplies a control signal to the switching unit 20a so as to set the mode of the signals input to and output from the input terminal A-IN and the output terminal A-OUT, respectively, to the analog system. The control unit 20b also supplies a control signal to the feedback disconnection circuit 2b so that the internal resistance unit 2a is connected to the feedback circuit. The control unit 20b also supplies a switching signal to the switches SW5 and SW6 connected to line A and line B, respectively, so that the external resistance R1 is used. Thus, the 600 Ω termination is implemented as a total of the external termination resistance R1 and the internal termination resistance.

The phase compensation circuit for the operational amplifiers AP1 and AP2 of the signal output unit 40 is set as follows. The switch SW1 connects the phase compensation circuit 7A to the phase compensation terminal of the operational amplifier AP1, and switch SW2 is connected to the capacitor C1. The switch SW3 causes the phase compensation circuit 7A to the phase compensation terminal of the operational amplifier AP2, and the switch SW4 is connected to the capacitor C1. The operational amplifiers AP1 and AP2 are provided with sufficient phase compensation, resulting in a characteristic f3 as shown in FIG. 4.

The bias unit 30 and the signal output unit 40 are separate. The operational amplifiers operated in a low withstand voltage and a broadband characteristic are provided in the signal output unit 40. The bias unit 30 for operating the operational amplifiers supplies a high bias voltage to the subscriber line so that signal output unit 40 supplies a signal voltage.

A description will be given of the operation of the circuit of FIG. 17 in the 2B1Q system.

The control unit 20b supplies a control signal to the switching unit 20a so as to set the mode of the signals input to and output from the input terminal A-IN and the output terminal A-OUT, respectively, to the 2B1Q system. The control unit 20b also supplies a control signal to the feedback disconnection circuit 2b so as to disconnect the internal termination resistance 2a. Thus, the feedback circuit is removed so that the circuit becomes an open loop.

The control unit 20b supplies switching signals to the switches SW5 and SW6 so that the external termination resistance R2 is used. The value of the resistance of the external resistance R2 is set to half of the termination resistance. Thereby, a termination of 123 Ω, which is close to 135 Ω, is provided.

The phase compensation circuit for the operational amplifiers AP1 and AP2 of the signal output unit 40 is set as follows. The switch SW1 connects the phase compensation circuit 7A to the phase compensation terminal of the operational amplifier AP1, and switch SW2 is connected to the capacitor C2. The switch SW3 connects the phase compensation circuit 7A to the phase compensation terminal of the operational amplifier AP2, and the switch SW4 is connected to the capacitor C2. The operational amplifiers AP1 and AP2 are provided with sufficient phase compensation, resulting in a characteristic f2 as shown in FIG. 4.

The bias unit 30 and the signal output unit 40 are separate. The operational amplifiers operated in a low withstand voltage and a broadband characteristic are provided in the signal output unit 40. The bias unit 30 for operating the operational amplifiers supplies a high bias voltage to the subscriber line so that signal output unit 40 supplies a signal voltage.

A description will be given of the operation of the circuit of FIG. 17 in the ping-pong system.

The control unit 20b supplies a control signal to the switching unit 20a so as to set the mode of the signals input to and output from the input terminal A-IN and the output terminal A-OUT, respectively, to the ping-pong system. The control unit 20b also supplies a control signal to the feedback disconnection 2b so as to disconnect the internal termination unit 2a. Thus, the feedback circuit is removed so that the circuit becomes an open loop.

The control unit 20b supplies switching signals to the switches SW5 and SW6 so that the external termination resistance R2 is used. The value of the resistance of the external resistance R2 is set to half of the termination resistance. Thereby, a termination of 123 Ω, which is close to 110 Ω, is provided.

The control unit 20b switches the switches SW1 and SW3 to the other side in order to disconnect the phase compensation circuit for the operational amplifiers AP1 and AP2. Thus, the phase compensation circuits are disconnected from the respective operational amplifiers. The characteristic of the operational amplifiers is indicated by curve f1 of FIG. 4.

The bias unit 30 and the signal output unit 40 are separate. The operational amplifiers operated in a low withstand voltage and a broadband characteristic are provided in the signal output unit 40. The bias unit 30 for operating the operational amplifiers supplies a high bias voltage to the subscriber line so that signal output unit 40 supplies a signal voltage.

According to the second embodiment, the switching control unit 20 controls connection and disconnection of the feedback circuit 2A and controls phase compensation of the signal output unit 40. In this way, the subscriber circuit adapted for the analog system, the 2B1Q system and the ping-pong system is implemented.

By separating the signal output unit 40 and the bias unit 30, by configuring the operational amplifiers constituting the signal output unit 40 to operate in a low voltage resistance and in a broadband, and by configuring the operational amplifiers in the bias unit 30 to operate in a high withstand voltage and in a narrow band, the subscriber circuit is realized in which operational amplifiers with a high withstand voltage and operational amplifiers with a broadband characteristic are used.

By connecting or disconnecting a phase compensation circuit for the amplifiers of the signal output unit 40, the subscriber circuit can be adapted for the analog system, the 2B1Q system and the ping-pong system.

By connecting the feedback circuit connecting the signal reception unit 8 and the signal output unit 40, in the analog system, and disconnecting the same in the 2B1Q system and the ping-pong system, the subscriber circuit is adapted for the analog system, the 2B1Q system and the ping-pong system.

By switching between external termination resistances depending on whether the analog system, the 2B1Q system or the ping-pong system is used, the termination most adapted for the system used is implemented.

By controlling the value of the external termination resistance to be in the middle of the value for the ping-pong system and the value for the 2B1Q system, and by switching between the internal termination resistance for the analog system and the external termination resistance, it is possible to share the external termination in the 2B1Q system and the ping-pong system.

In the second embodiment, the common mode choke coil L is connected between line A and line B. Accordingly, it is possible to suppress distortion from a difference signal due to a difference in a through rate caused by a high-speed operation of the operational amplifier for line A and the operational amplifier for line B.

To summarize the advantages of the first and second embodiments described above, a single subscriber circuit is configured to be adapted for the analog system, the 2B1Q system and the ping-pong system, by switching control effected by the control unit 20b.

By segmenting the operational amplifiers shared by the three systems into those for signal output and dc component output in the bias unit, the operation of the operational amplifiers for signal output is controlled to occur in the neighborhood of a signal voltage. Thus, high-speed operation of the operational amplifiers is realized.

Since high-speed operation is not required of the operational amplifiers in the bias unit supplying a bias voltage, the operational amplifiers with a high withstand voltage can be implemented. Accordingly, operational amplifiers with a high withstand voltage and operational amplifiers with a high-speed operation are both implemented. Therefore, a single circuit is configured to be adapted for the analog system, the 2B1Q system and the ping-pong system.

A description will be given of the power feed circuit according to the embodiments of the present invention.

The DC/DC converter 1020 comprises a power conversion transformer T3, an on/off switch SW and a rectifying diode D1. The DC/DC converter 1020 is controlled according to the voltage/current of the subscriber lines 1013, 1014 by the controller 1050. The output of the DC/DC converter 1020 needs to be controlled to supply a current via a resistance of approximately 400 Ω in case of an analog subscriber.

For this reason, the controller 1050 controls the DC/DC converter 1020 to simulate a voltage drop commensurate with 400 Ω from 48V, using a voltage/current detected by the voltage/current detection circuit 1015.

The choke coils L10, L11 block only the frequency components of a digital signal (high frequency component). A small coil having inductance on the order of several mH is sufficient for this purpose.

The electronic choke circuits 1011, 1012 have only to block sound frequency (approximately in the range 100 Hz–4 kHz). When a high frequency circuit is composed of an electronic circuit, it usually costs a lot. However, the circuit may not be compatible with a high-frequency. The high-frequency is blocked by the choke coils L10, L11. A constant-current circuit using an operational amplifier may be used as the electronic choke circuits 1011, 1012.

According to the construction of this invention, the analog sound signal is blocked by the electronic choke circuits 1011, 1012 from leaking to a power supply unit, and the digital sound signal is blocked by the choke coils L10, L11 from leaking to a power supply unit. In this way, the signal coupling transformer is shared between the analog system and the digital system.

Figure 18:
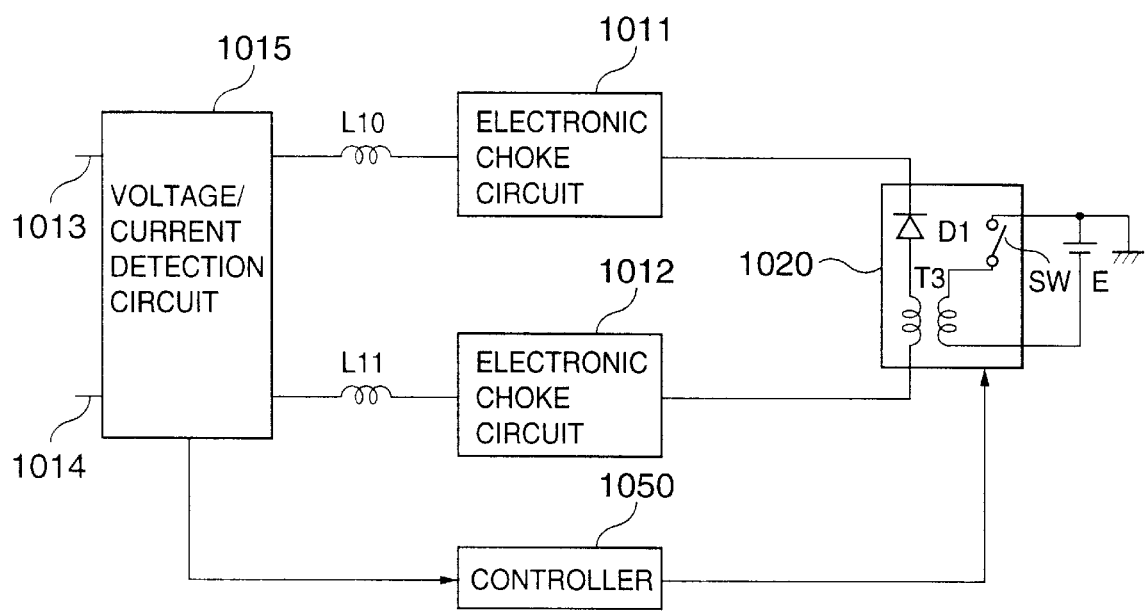
FIG. 18 is a block diagram showing a principle of a power feed circuit according to the present invention.
Figure 19:
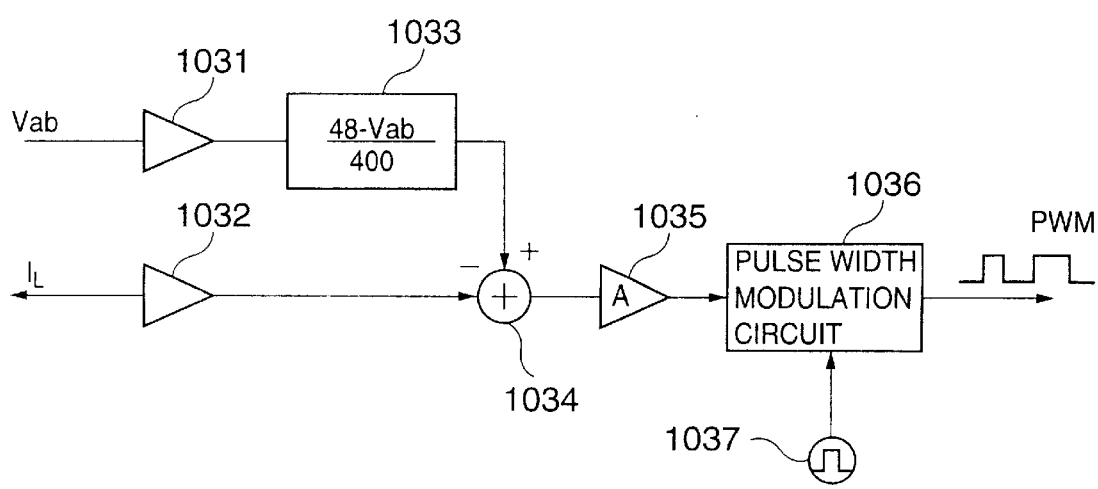
FIG. 19 is a block diagram showing a controller according to an embodiment of the present invention.

FIG. 19 is a block diagram showing the controller 1050 according to an embodiment of the present invention. In FIGS. 18 and 19, like numerals represent like components.

Referring to FIG. 19, a buffer amplifier 31 receives a line voltage Vab detected by the voltage/current detection circuit 1.015, and a buffer amplifier 32 receives an output current IL detected by the voltage/current detection circuit 1015.

An operation unit 1033 receives an output of the buffer amplifier 1031 so as to perform a predetermined operation, an addition and subtraction unit 1034 synthesizes the output of the operation unit 1033 and the output of buffer amplifier 1032, an amplifier 1035 amplifies the output of the addition and subtraction unit 1034 with a gain of A, a pulse phase modulation circuit 1036 receives the output of an oscillator 1037 and the output of the amplifier 1035 so as to output a PWM signal (pulse width modulation signal). An operation of the circuit constructed in this way will be explained in the following.

The DC/DC converter 1020 is controlled according to the voltage/current of the subscriber lines 1013, 1014 by the controller 1050. In case of an analog subscriber, a current needs to be supplied via a resistance value of about 400 Ω. For this reason, the controller 1050 controls the DC/DC converter 1020 to simulate a voltage drop commensurate with 400 Ω from 48V to be applied to the voltage/current detected by the voltage/current detection circuit 1015. The current and the voltage are represented by the following equations.

$$Iimg=(48-Vab)/400 \text{ V} \qquad (1)$$

$$Vpwm=A(Iimg-IL) \qquad (2)$$

where Iimg indicates a target value of the output current, IL indicates a currently detected output current. The signal Vpwm obtained by amplifying a difference between Iimg and IL by the factor of A by the amplifier 1035 is the voltage that the DC/DC converter 1020 should output. This voltage Vpwm enters a pulse width abnormality circuit 1036.

The pulse width abnormality circuit 1036 produces a PWM signal in proportion to the input signal Vpwm, and controls on/off of the switching element SW in the DC/DC converter.

Instead of the line voltage Vab mentioned above, the potential of each subscriber line may be detected so as to obtain the line voltage by computation.

The controller 1050 described above computes an output current or determines the same upon receipt of the output of the voltage/current detection circuit 1015, varies a drive pulse width of the DC/DC converter so as to be equal to the target value, so that the output current is maintained at a constant level.

The power feed system shown in FIG. 18 controls a power feed current by controlling the output of the DC/DC converter 1020. The control of the DC/DC converter 1020 is effected by the controller 1050. However, the controller can be implemented by a DSP.

Figure 20:
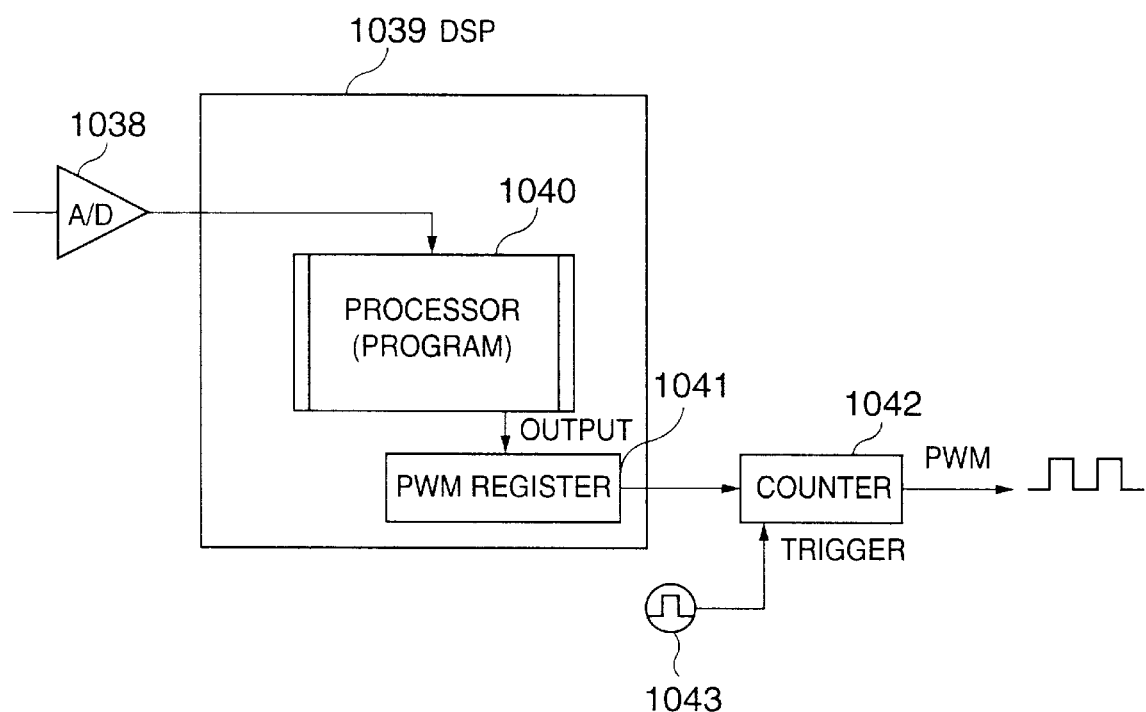
FIG. 20 shows a PWM signal generating circuit according to an embodiment of the present invention.

A DSP is known as a processor for processing a high-speed signal. The dedicated control circuit can be eliminated by using a DSP to perform a signal process and power feed.

control. FIG. 20 shows a PWM signal generating circuit according to an embodiment.

Referring to FIG. 20, an A/D converter 1038 converts the output of the voltage/current detection circuit 1015 into a digital signal, and a DSP 1039 receives the output of the A/D converter 1038 so as to perform a predetermined operation. A processing unit 1040 of the DSP 1039 receives the output of the A/D converter 1038 so as to perform a predetermined operation. For example, the processing unit 1040 can be implemented by a program. A PWM register 1041 receives the output of processing unit 1040, and maintains the same. a counter 1042 receives the output of the oscillator 1043 as a period signal (trigger), causing the output of the register 1041 to be preset, and produces a on-time by down-counting the clock. The output of the counter 1042 becomes a PWM signal. A description will now be given of the operation of the circuit constructed in this way.

The A/D converter 1038 receives the output of the voltage/current detection circuit 1015 and converts the line voltage Vab and the output current IL into respective digital signals. The processing unit 1040 receives the detected line voltage Vab and the output current IL and performs operations of the equations (1) and (2) described above, so as to calculate a difference between the target value of the output current and the actually detected current. The result of operation is temporarily stored in the PWM register 1041.

Figure 21:
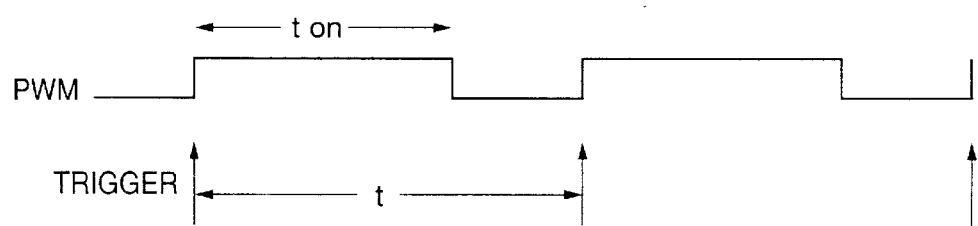
FIG. 21 is a time chart showing an operation of the circuit shown in FIG. 20.

The value of the register 1041 is preset in the counter 1042. The counter 1042 receives a leading edge of the clock supplied by the oscillator 1043 as a trigger, as shown in FIG. 21, down-counts from a preset value, and maintains the PWM signal at the "1" level till the output thereof is 0. FIG. 21 is a time chart showing the operation of the circuit shown in FIG. 20. An interval between a trigger and a trigger is a period t, and time ton elapsed before the count of the counter 1042 is 0 is a conducting time of the switching element SW of the DC/DC converter 1020.

According to this embodiment, the DSP 1039 computes the output current or obtain the output current by receiving the output of the voltage/current detection circuit 1015. The counter 1042 of the DSP 1039 down-counts the clock so that the output of the counter 1042 is used to drive the DC/DC converter 1020 as a PWM pulse. Thus, the output current is maintained at a constant level.

Figure 22:
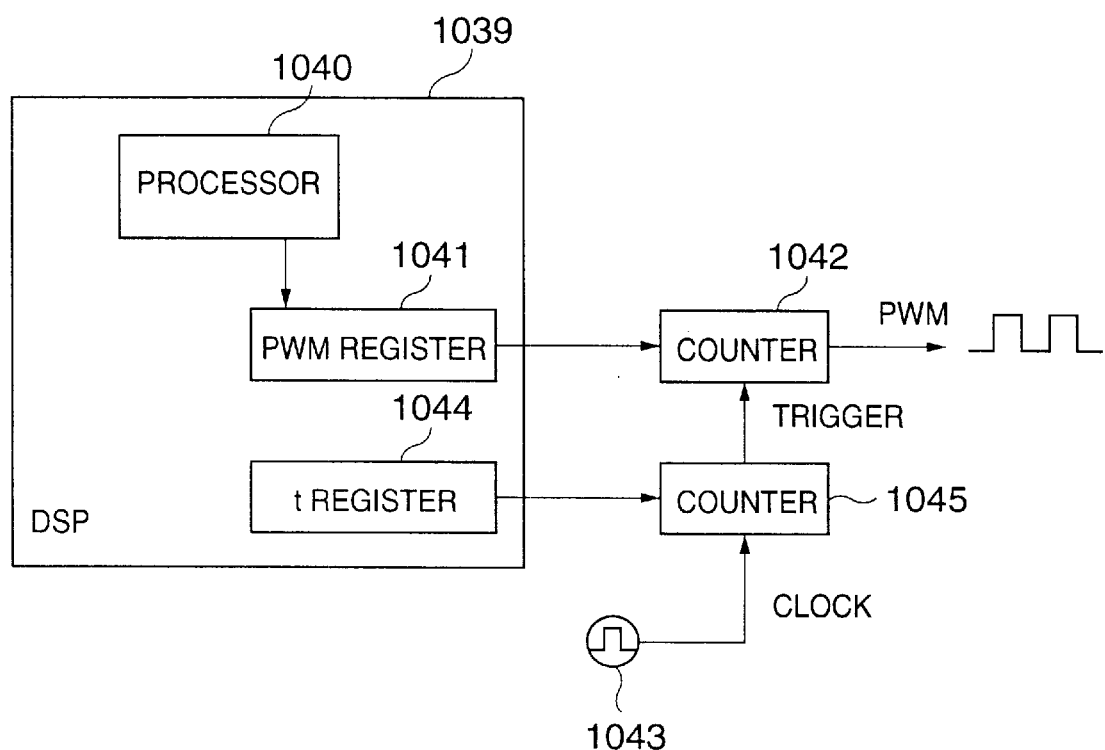
FIG. 22 shows the PWM signal generating circuit according to another embodiment.

FIG. 22 shows the PWM signal generating circuit according to another embodiment. In FIGS. 20 and 22, like numerals represent like components. The circuit of FIG. 22 features a t register 1044 for setting a period of the PWM pulse. A counter 1045 receives the clock from the oscillator 1043 and counts till the value set in the t register 1044 is reached. The counter 1045 outputs a trigger indicating a period so as to provide it to the counter 1042.

A description will be given of the circuit of FIG. 22.

An operation for obtaining a difference between a target current and the actual output value in the DSP 1039 is the same as the corresponding operation in the circuit shown in FIG. 20. In the circuit of FIG. 22, the period t of the PWM pulse may be preset in the t register 1044.

The value of the register 1041 is preset in the counter 1042. The counter 1042 receives a leading edge of the output supplied by the counter 1045 as a trigger, down-counts from a preset value, and maintains the PWM signal at the "1" level till the output thereof is 0.

The counter 1045 receives data supplied by the t register 1044 as a preset value, down-counts the output clock of the oscillator 1043. The counter 1045 generates a trigger signal every time the output thereof is 0 so as to give it to the counter 1042.

Figure 23:
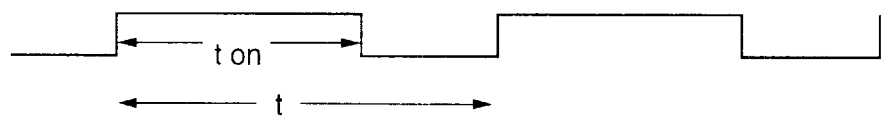
FIG. 23 is a time chart showing an operation of the circuit shown in FIG. 22.

FIG. 23 is a time chart showing an operation of the circuit shown in FIG. 22. t indicates a period of the PWM signal and time ton elapsed till the count of the counter 1042 reaches 0 is a conducting time of the switching element SW of the DC/DC converter 1020.

According to this embodiment, the DSP 1039 computes the output current or obtain the output current by receiving the output of the voltage/current detection circuit 1015. The counter 1042 of the DSP 1039 down-counts the clock so that the output of the counter 1042 is used to drive the DC/DC converter 1020 as a PWM pulse. Thus, the output current is maintained at a constant level.

In this embodiment, it is possible to preset data relating a period of PWM in the t register 1044. For this reason, oscillation matching the characteristic of the transformer T for the DC/DC converter 1020 can be performed. When the frequency of the PWM signal is raised, it is possible to reduce the size of the transformer (power conversion transformer) T3 for the DC/DC converter. However, such an attempt increases a power consumption, thus causing the conversion efficiency to drop. Also affected is the amplitude of the ripple noise. So these characteristics can be adjusted Later if the oscillation frequency of the PWM pulse is preset by the DSP 1039.

In this way, according to this embodiment, the storage means (the t register 1044) stores information relating to a period of the output PWM pulse, and, based on this memory value, time is periodically counted, and the frequency of the pulse width modulation signal is varied. In this way, the output current is maintained at a constant level.

A description will now be given of floating power feed and non-floating power feed. Since the primary side and the secondary side of the transformer T are insulated, the circuit shown in FIG. 18 is a floating power feed circuit. The floating power feed system may be suitable in the digital system, but is not favorable in the case of the analog system.

In the analog system, the subscriber lines 1013, 1014 were put at a negative potential to prevent galvanic corrosion. For this reason, it is preferable that the power feed system wherein the ground is designated as a reference is provided. It is desirable to provide means to connect/disconnect the mid-point tap of the DC/DC converter 1020 or the mid-point of the potential between the lines to −24 V, in order to switch between the floating power feed and the non-floating power feed depending on whether the analog system or the digital system is used.

With this construction, the switch can put the primary side and the secondary side of the DC/DC converter 1020 to a fixed potential in the case of analog sound, and put them in a floating state in the case of digital sound.

Figure 24:
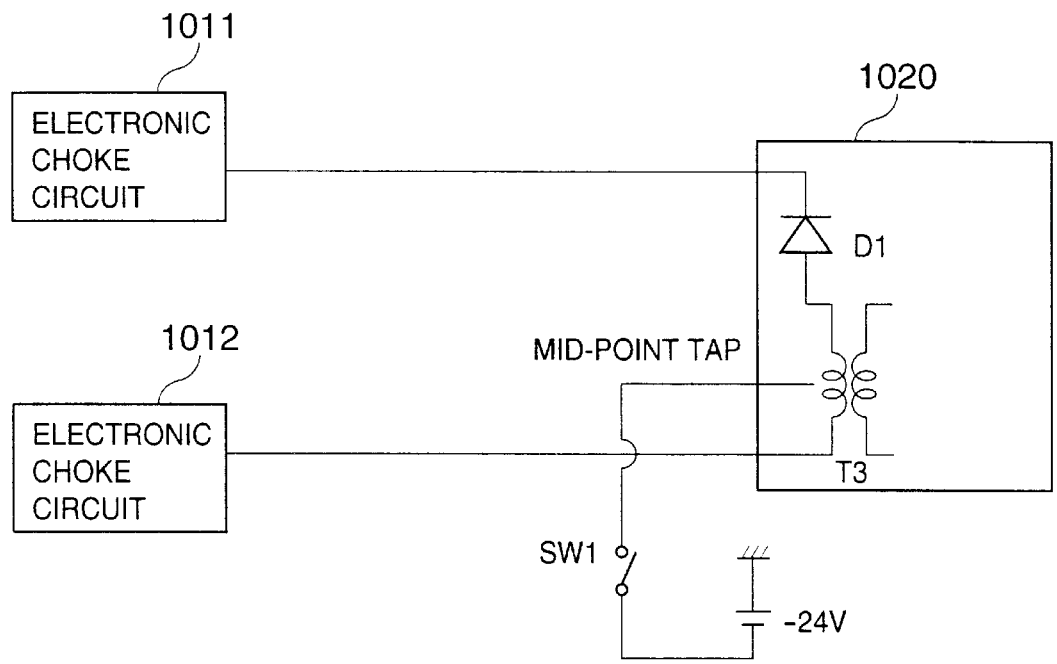
FIG. 24 shows a switch circuit for switching between floating and non-floating.

FIG. 24 shows the switch circuit for switching between floating and non-floating. In FIGS. 18 and 24, like numerals indicate like components. In the switch circuit of FIG. 24, the switch SW1 having one end thereof connected to −24 V is provided. The end of this switch SWI is connected to the mid-point tap of the secondary winding of the power conversion transformer T 3.

Accordingly when the switch SW1 is turned on, the mid-point of the power conversion transformer T3 is fixed to −24 V and become most suitable for the analog system. When the Switch SW1l is turned off, the floating state is introduced, so that the circuit becomes most suitable for the digital system.

According to this embodiment, setting of a fixed potential for the analog sound becomes possible by turning the switch SW1 on, and fixing the center of the floating power feed unit to a specific fixed potential of −24 V.

Figure 25:
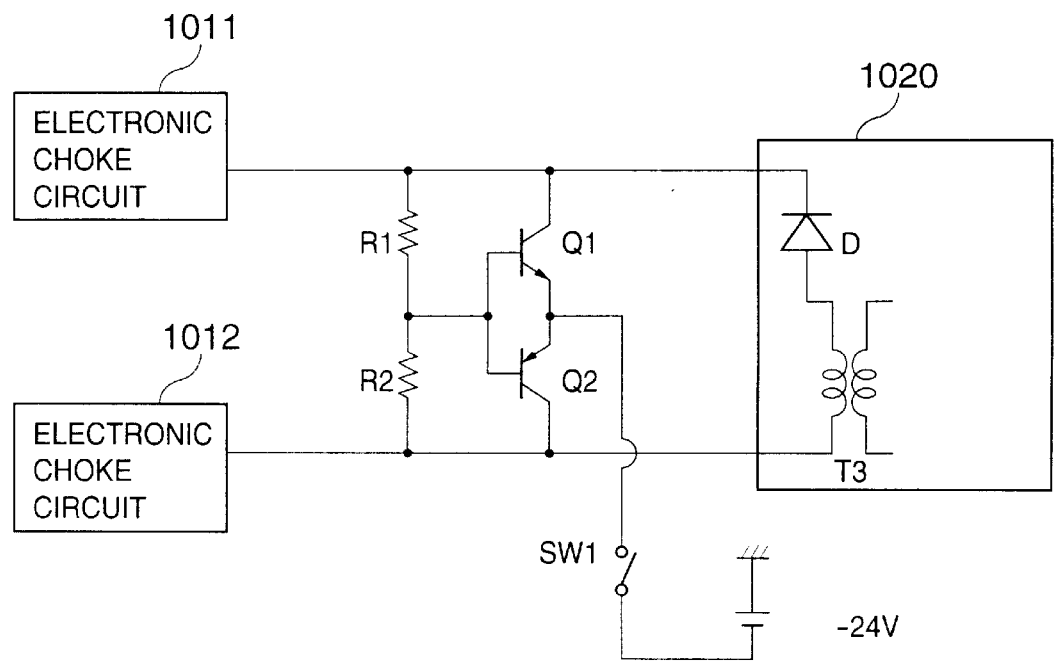
FIG. 25 shows a switch circuit for switching between floating and non-floating according to another embodiment.

FIG. 25 shows the switch circuit for switching between floating and non-floating according to another embodiment. In FIGS. 24 and 25, like numerals represent like components. In this embodiment, a voltage division circuit: formed by resistances R1 and R2 is provided between the output lines of the DC/DC converter 1020, and the potential of this mid-point is connected to a common base junction unit of the circuit formed by transistors Q1, Q2.

The common emitter junction unit of the transistors Q1, Q2 is connected to −24V by the switch SWI. Accordingly, it is possible to fix the common emitter junction unit of the transistors Q1 and Q2 to −24V by turning the switch SW1 on.

According to this embodiment, setting of a fixed potential for the analog sound becomes possible by turning the switch SW1 on, and fixing the center of the floating power feed unit to a specific fixed potential of, for example, −24 V.

A description will now be given of switching of the transformer depending on whether the sound or a pulse is processed. Because a transformer for the sound in a subscriber circuit operates on a relatively low frequency, a transformer with a relatively large number of turns is necessary. In contrast, in case of the digital subscriber circuit, the sound signal is digitally (in pulses) transmitted so that the amplitude is relatively large. Therefore, a transformer with a relatively small number of turns is necessary.

Figure 26:
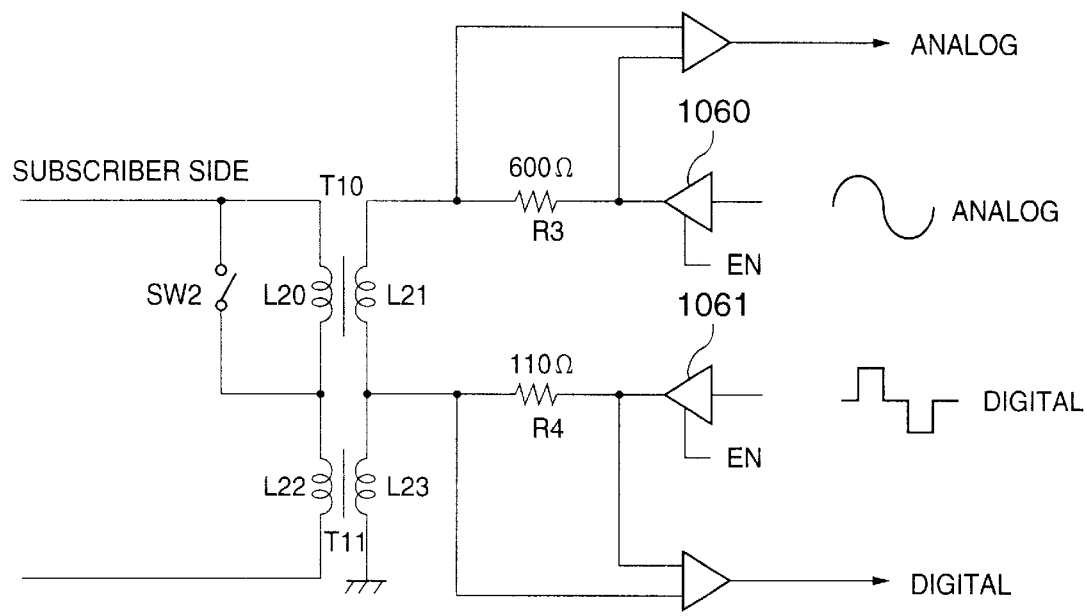
FIG. 26 shows an analog/digital switch circuit according to an embodiment of the present invention.

FIG. 26 shows the analog/digital switch circuit according to an embodiment of the present invention. Referring to FIG. 26, T10 indicates a transformer for analog sound, T11 indicates a transformer for digital sound. L20 indicates a primary winding of the transformer T10 for the analog sound, and L21 indicates a secondary winding thereof. L22 indicates a primary winding of the transformer T11 for the digital sound, and L23 indicates a secondary winding thereof.

Numeral 60 indicates a driver for an analog sound signal, 61 indicates a driver for digital sound. The output of the driver 60 is connected to the secondary winding L21 of transformer T10 for analog sound via a termination resistance R3 of 600 Ω. The output of the driver 61 is connected to the secondary winding L23 of the transformer T11 for digital sound via a termination resistance R4 of 110 Ω. A switch SW2 is provided to short-circuit the first winding L20 of the transformer T10 for analog sound.

When the transformer is used as a transformer for analog sound in the circuit constructed in this way, the switch SW2 is turned off. As a result, the sound signal output from the driver 60 is transmitted to the secondary side via a coupling transformer formed by the transformer T10 for analog sound and the transformer T11 for digital sound. That is, an analog signal is caused to flow in the windings of the two transformers. The transformer T11 for digital sound has a smaller number of turns, and the inductance thereof is smaller than the inductance of the transformer T10 for analog sound, so that the effect provided by the inductance of the transformer T11 can be neglected. The output of the driver 1061 for digital signal is disabled using an enable signal EN so that a high impedance state is introduced.

When the transformer is used as a transformer for digital sound, the switch SW2 is turned on, and both ends of the first winding L20 of the transformer T10 for analog sound is short-circuited. As a result, this circuit functions as a transformer for digital sound. That is, the output of the driver 1061 is transmitted to the secondary side via the transformer T11 for digital sound. The output of the driver 60 for an analog signal is disabled using an enable signal EN so that a high-impedance state is introduced.

According to the construction of this invention, a signal coupling transformer can be used both in the analog signal mode and in a digital signal mode, by selectively using the analog signal transformer and the digital signal transformer connected in series.

Figure 27:
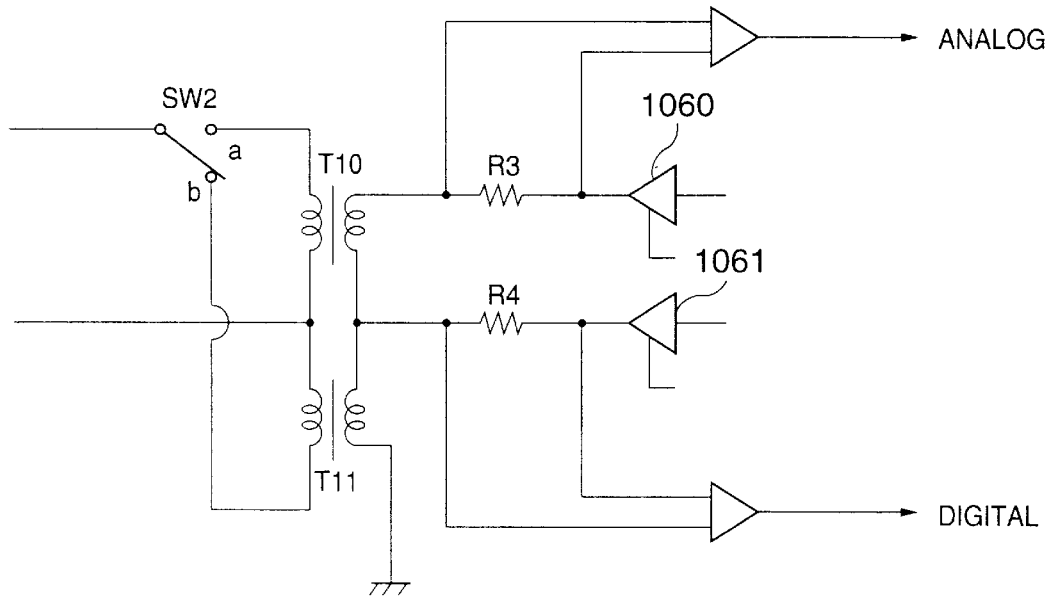
FIG. 27 shows an analog/digital switch circuit according to another embodiment.

FIG. 27 shows the analog/digital switch circuit according to another embodiment. In FIGS. 26 and 27, like numerals indicate like components. In this embodiment, a switch SW3 having two points of contact is used to switch between the analog sound mode and the digital sound mode.

The switch SW3 is connected to a point of contact a when the switch SW3 is used for analog sound, and is connected to a point of contact b when it is used for digital sound. With this, the circuit can be adapted for both the analog system and the digital system.

The advantage of the circuit of FIG. 26 is that the switch SW2 need have only one point of contact. If the switch SW3 as shown in FIG. 27 is used, the same facilities as the facilities of FIG. 26 can be implemented. However, this requires a two-contact switch. The switch SW3 shown in FIG. 27 can be constructed using mechanical relays, with hardly any operation occurring (because setting of analog or digital is completed by the first setting). Mechanical relays exhibits variation with time in that the point of contact resistance increases when it is not operated. In contrast, a photo MOS relay or the like having only on/off facilities can be used as the switch SW2 in the circuit shown in FIG. 26.

Figure 28:
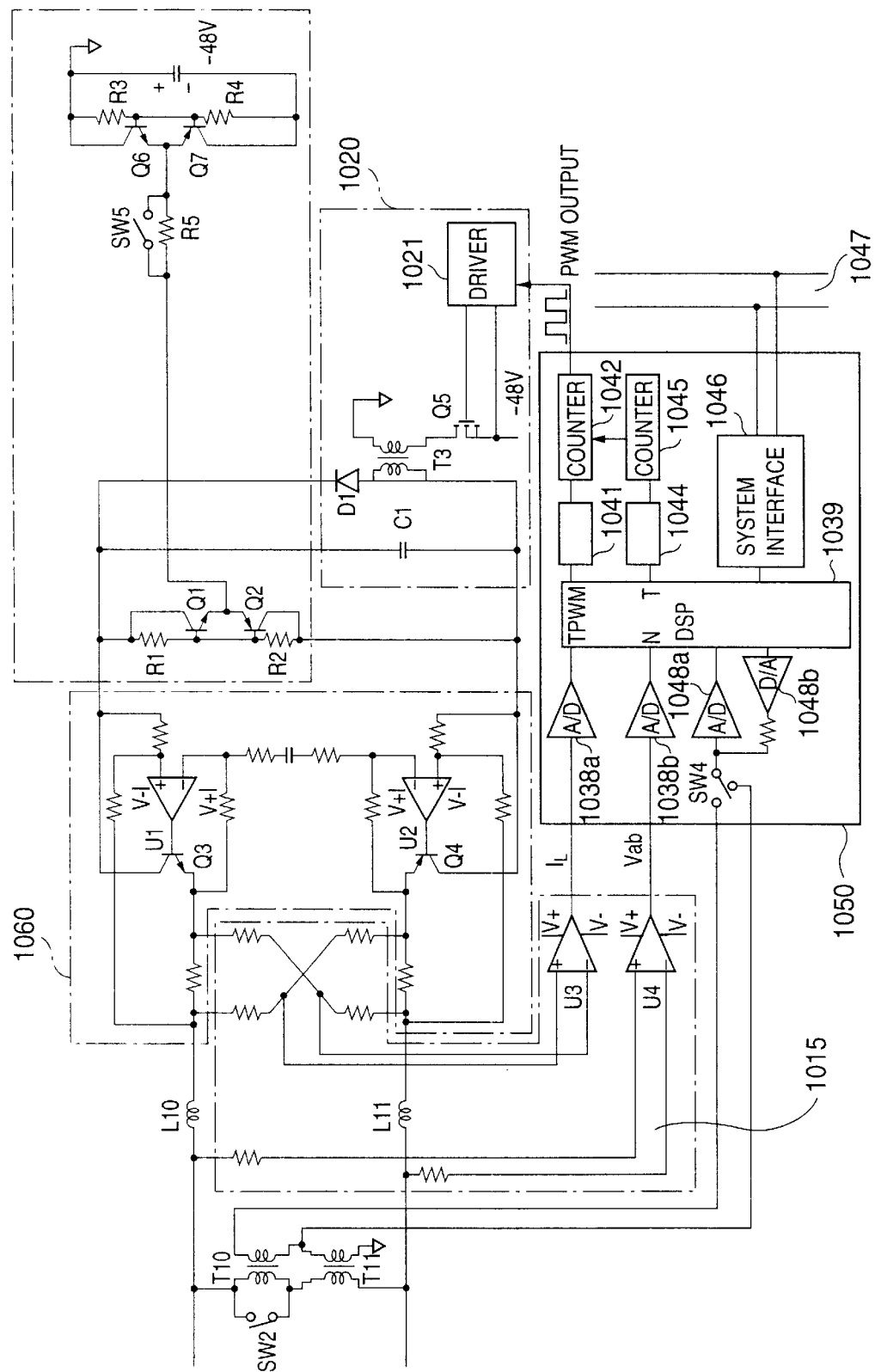
FIG. 28 is a detailed circuit diagram showing the power feed circuit according to an embodiment of the present invention.

FIG. 28 is a detailed circuit diagram showing the power feed circuit according to an embodiment of the present invention.

In FIGS. 18, 20, 22, 26 and 28, like numerals represent like components. Referring to FIG. 28, the power feed circuit comprises: an electronic choke circuit 1060. In FIGS. 28, a combination of the electronic choke circuits 11 and 12 of FIG. 18 is shown. The power feed circuit also comprises a voltage/current detection circuit 1015 for detecting a voltage and a current of the subscriber lines; a controller 1050 which receives an output of the voltage/current detection circuit 1015 and controls the DC/DC converter 1020 so as to produce a voltage drop commensurate with the power feed resistance and output a pulse width modulation (PWM) signal.

The power feed circuit also comprises a switching converter 1020 for switching a −48 V voltage so as to produce a dc voltage for power; a floating/non-floating switching unit 1070 for switching between a floating mode and a fixed potential mode of the circuit.

Figure 29:
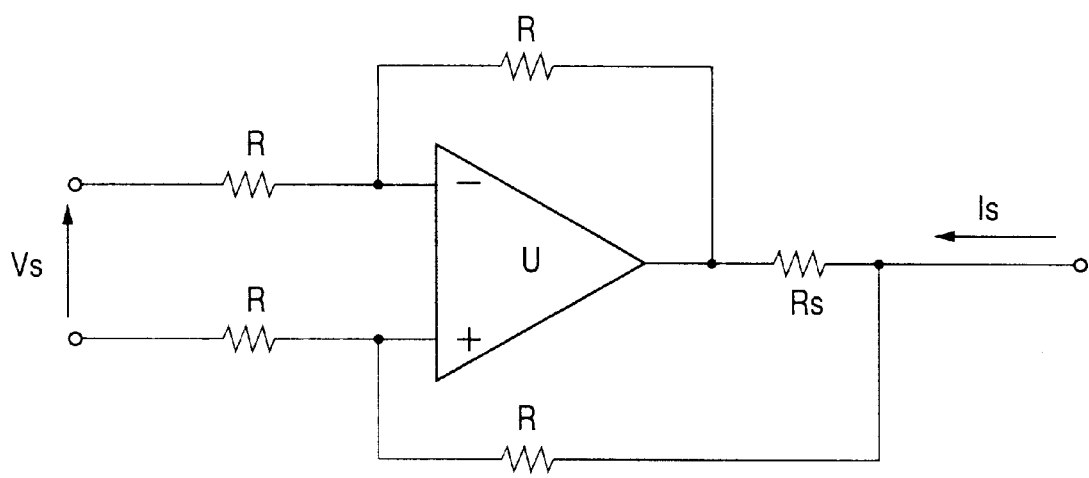
FIG. 29 shows a constant-current circuit.

The electronic choke circuit 1060 consists of a first constant-current source for current output and a second constant-current source for inlet of a current. These constant-current sources is composed of an operational amplifier U1, a boost transistor Q3, an operational amplifier U2 and a boost transistor Q4, and resistors. The construction of the constant-current source is as shown in FIG. 29. The circuit shown in FIG. 29 constitutes a transconductance circuit. Assuming that the resistances R shown in FIG. 29 have the same value, the input voltage is Vs, the reference resistance Rs, the output current Is is given by $$Is=Vs/Rs \qquad (3)$$

A current given by (3) flows from the constant-current source for current output and flows in the load (telephone set) via the choke coil L10. The current that passes through the load is fed to the constant-current source for inlet of a current via the choke coil L10.

The electronic choke circuit 1060 has a high-impedance with respect to a sound signal and blocks the analog sound signal to a power supply unit. The power of the electronic choke circuit 1060 is supplied by the DC/DC converter 1020. By feeding the power from the DC/DC converter 1020, the subscriber line is subject to floating power feed. When an analog sound signal is processed, the switch SW5 is turned on so that a non-floating state is introduced.

When a digital sound signal is processed, the choke coils L10 and L11 inserted in the subscriber lines are put in a high-impedance state. The digital sound signal is blocked from leaking to the power supply unit. The inductance of the choke coils L10 and L11 may be on the order of several mH.

A description will now be given of the operation of the voltage/current detection circuit. The detection provided between the first constant-current source and the second constant-current source detects the line voltage Vab and the output current IL. The differential amplifier U4 is supplied with the voltage of the subscriber line and outputs a difference in the voltage as the line voltage Vab. The differential amplifier U3 is fed with a signal commensurate with the output current and outputs a difference in the signals as the output current IL.

A description will now be given of the operation of the controller 1050. The outputs IL, Vab of the differential amplifiers U3 and U4, respectively, are fed to A/D converters 1038a and 1038b, respectively, before being processed by the DSP 1039. The DSP 1039 performs an operation as described with reference to FIGS. 20 and 22. The DSP 1039 maintains the output in a PWM register. The DSP 1039 processes a sound signal processing in the analog mode and a line equalization process in the digital mode. While the process is proceeding, the DSP 1039 performs a sequence for synthesizing a PWM signal for driving the DC/DC converter 1020. Numeral 1042 indicates a counter having an output of the PWM register 1041 preset, for down-counting the clock so as to produce an on-time.

Numeral 1044 indicates a t register for setting a period of the PWM pulse produced by the DSP 1039. Numeral 1045 indicates a counter for counting until the value set by the register 1044 is reached. The providing the t register 1044 is designed to modify the oscillation frequency in accordance with the characteristic of the power conversion transformer T3. The output of the t register 1044 is set in the counter 1045. The counter 1045 outputs a trigger indicating a period and supplies the same to the counter 1042.

The value of the PWM register 1041 is preset in the counter 1042. The counter 1042 receives a leading edge of the output provided by the counter 1045 as a trigger. The counter 1042 down-counts from the preset value and maintains the PWM signal at the "1" level until the output thereof is 0.

The counter 1045 receives data supplied by the t register 1044 as a preset value and down-counts the output clock of the oscillator 1043. Every time the output of the counter 1045 becomes 0, the counter 1045 generates a trigger signal and supplies the same to the counter 1042. Thus, the counter 1042 outputs a pulse width modulation signal (PWM signal) and feeds the same to the DC/DC converter 1020.

The DSP 1039 is connected to a system interface 1046 and to a system bus 1047, an internal bus for a switch. Numeral 1048 a indicates an A/D converter for converting the sound signal from the sound coupling transformer T10 into a digital signal. Numeral 1048b indicates a D/A converter for converting the sound signal from the DSP 1039 into the analog signal. The input of the A/D converter 1048a and the output of the D/A converter 1048b are connected to the switch SW4.

The switch SW4 and the switch SW2 provided on the primary side of the analog sound coupling transformer T10 operate synchronously. In the analog signal processing, the switch SW2 is turned off and the switch SW4 selects the analog signal side. In the digital signal processing, the switch SW2 is turned on so as to short-circuit the primary side of the sound coupling transformer T10 and. only the sound coupling transformer T10 operates. The switch SW4 selects the digital signal side. The switch SW2 may be formed by a semiconductor relay or the like. The reason for this is that it can operate without causing degradation in the contact even after a prolonged use.

The signal from the subscriber line is transmitted to the switch (system bus 1047) via the A/D converter 1048a, the DSP 1039, the system interface 1046. The signal from the switch to the subscriber line is transmitted in the same route except that it passes through the D/A converter instead of the A/D converter.

A description will now be given of the operation of the DC/DC converter 1020. In the DC/DC converter 1020, a field electric transistor Q5 (switching element) is driven by a driver 1021 receiving the PWM signal output from the controller 1050 so as to turn on/off −48V voltage and generates an ac current on the secondary side of the power conversion transformer T3. The ac voltage, after rectified by the diode D1, is smoothed by the capacitor C1 and supplied to the first and second constant-current sources and the floating/non-floating switching unit 1070.

A description will be given of the operation of the floating/non-floating switching unit 1070. The −48V voltage is divided by the voltage division circuit formed by the resistances R3 and R4 and is supplied to a common base of the circuit comprising the transistors Q6 and Q7. The transistors Q6 and Q7 form an emitter follower construction having the emitters thereof connected to each other. The transistors Q6 and Q7 generates the −24V voltage with a low-output impedance.

The −24V voltage is supplied to a circuit comprising the transistors Q1, Q2 and the resistances R1 and R2. A switch SW5 is connected to the ends of the high-resistance R 5. When the switch SW5 is on, the high-resistance R5 is short-circuited so that the −24V voltage is supplied to the common emitters of the transistors Q1 and Q2, and the potential of the circuit is fixed. Such an arrangement is adapted for the analog signal processing.

When the digital signal is processed, the switch SW5 is turned off so that the −24V voltage is supplied to the common emitters of the transistors Q1 and Q2 via the resistance 100 kΩ. A high-impedance state and a floating state result.

To summarize the effects provided by the power feed circuit of the present invention, it is ensured that the power consumption is reduced in the analog system since the DC/DC converter performs power feeding.

Secondly, the circuit can be used both in the analog system and in the digital system.

Since a single circuit is used for both systems, it is not necessary to switch when the service is changed.

It is possible to control power feed using the DSP for signal processing.

A description will now be given of a switching power supply circuit according to the present invention.

Figure 30:
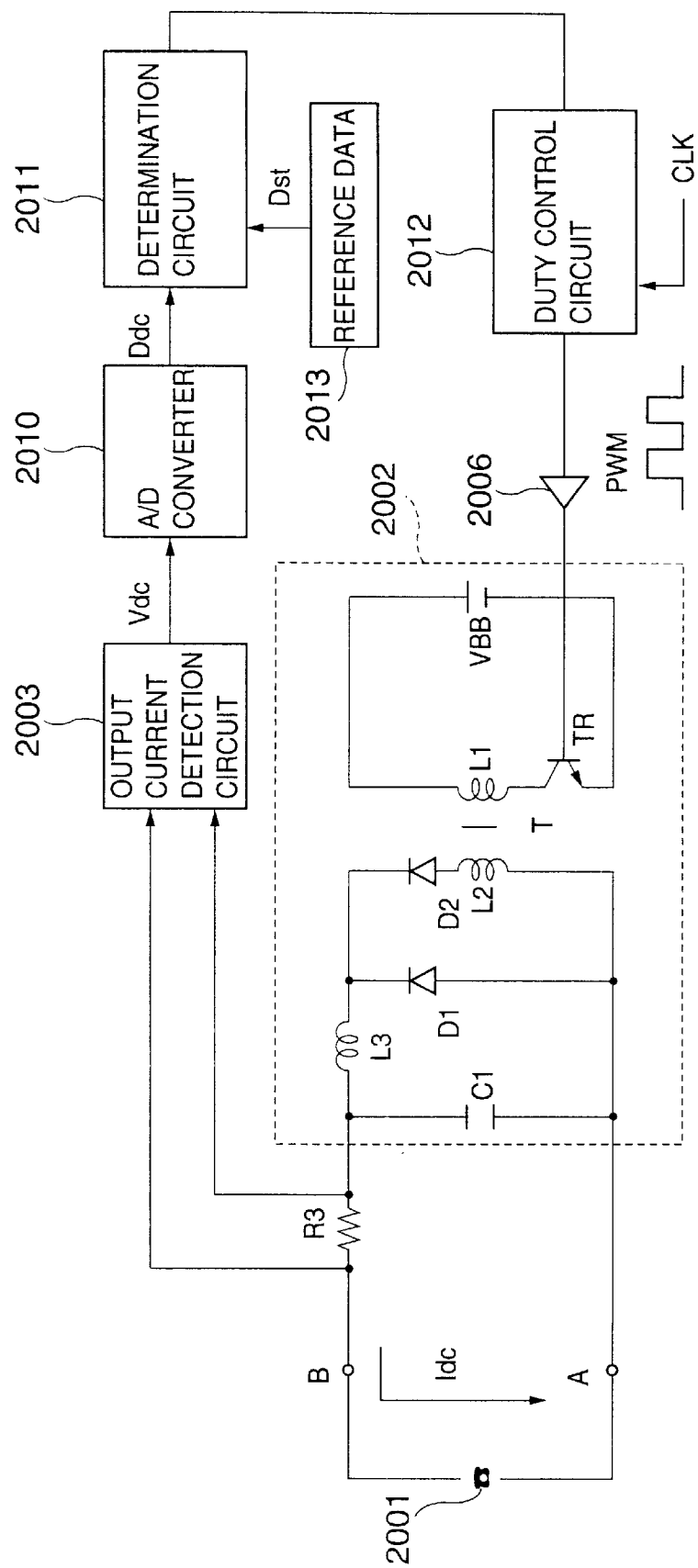
FIG. 30 is a block diagram showing a principle of the switching power supply according to the present invention.

FIG. 30 is a block diagram showing the switching power supply circuit according to the present invention.

Figure 31:
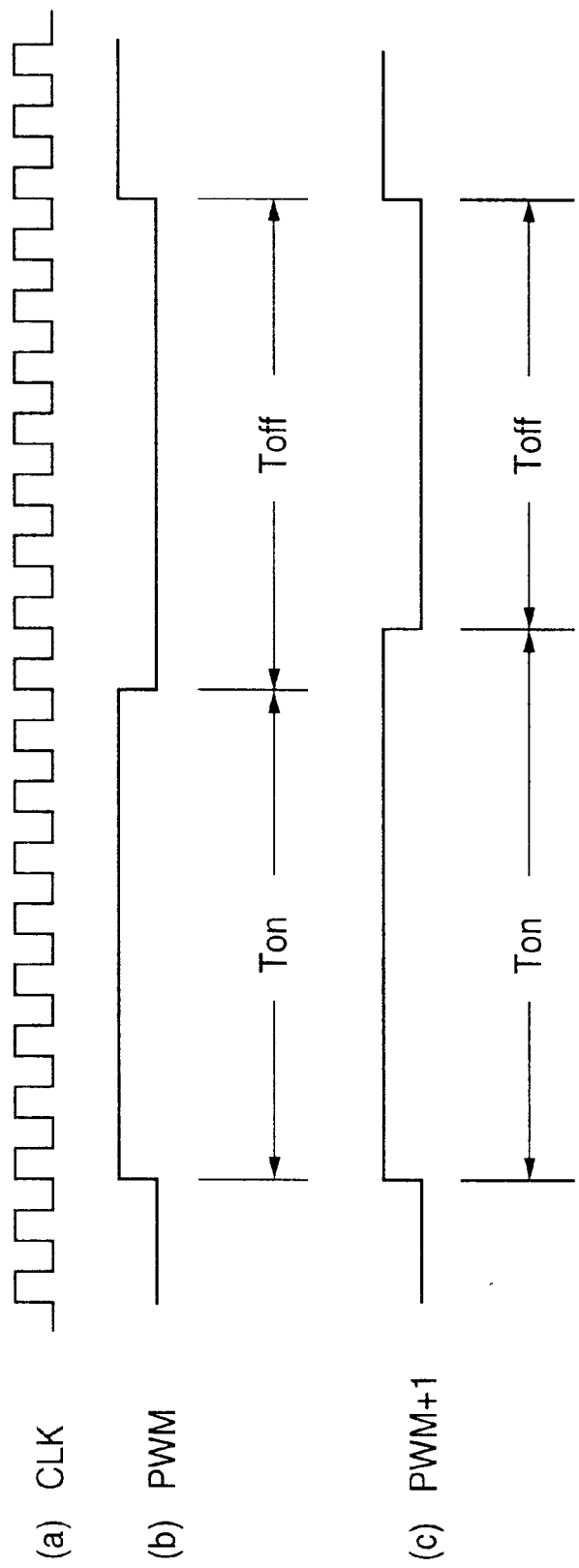
FIG. 31 shows PWM control according to the invention.

FIG. 31 shows PWM control according to the invention. (a) indicates a clock, (b) indicates a PWM pulse waveform, (c) indicates a waveform in which a clock is added to the PWM pulse. A high-frequency clock CLK as shown in (a) is input to the duty control circuit 2012 of FIG. 30. The frequency division of the clock is performed so that the PWM pulse as shown in (b) having a regular period is produced. Referring to (b), Ton indicates an on-time in which the switching element is turned on, and Toff indicates an off-time in which the switching element is turned off. Ton+Toff indicates a period of the PWM pulse. When the output current drops, the on-time of the switching element is increased as shown in (c). Since the duty control circuit is not an analog circuit but a digital circuit, Ton is increased in steps of one clock.

Figure 32:
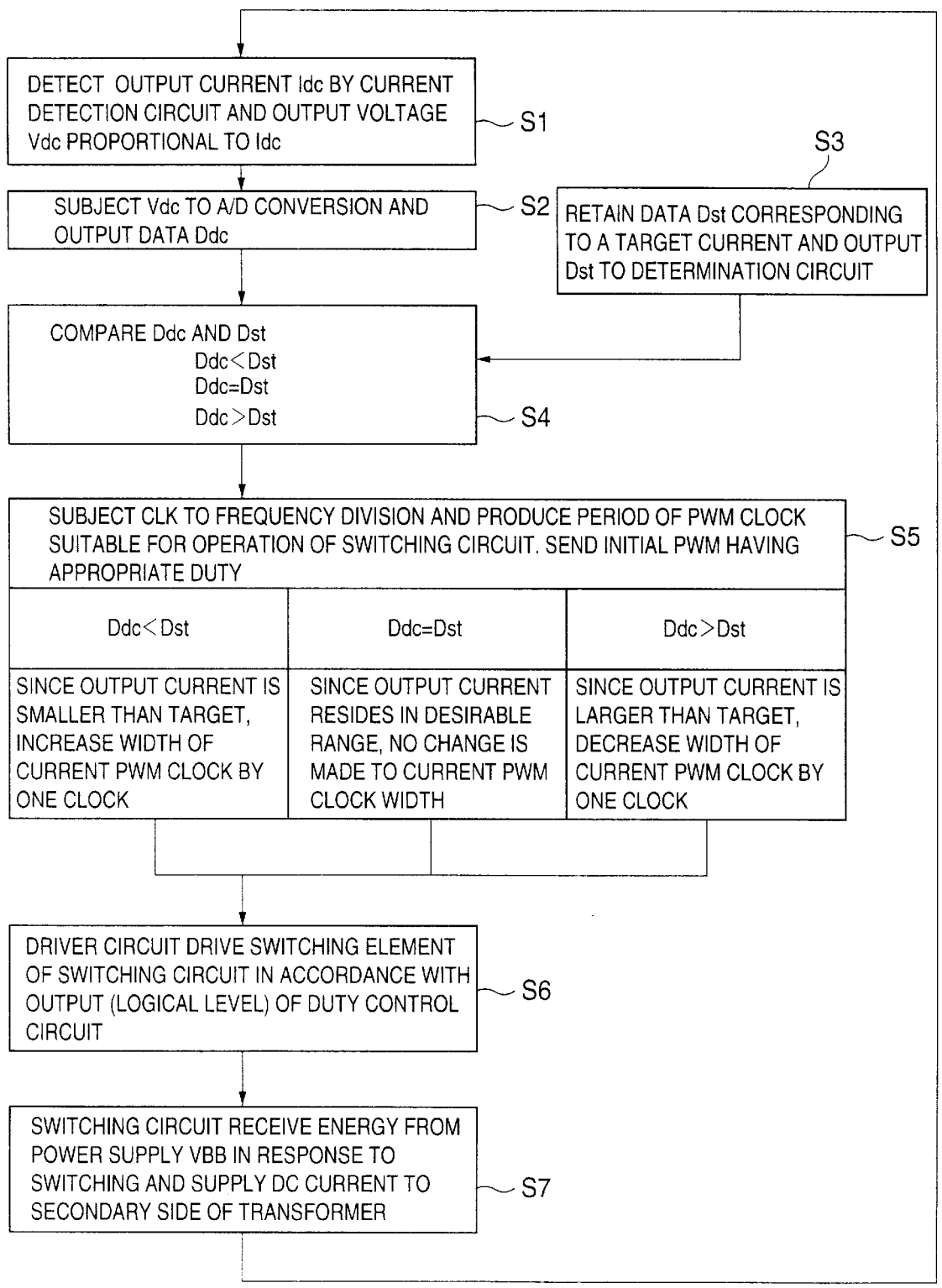
FIG. 32 is a flowchart of an operation of a duty random control according to the present invention.

A description will now be given of the operation of the circuit of FIG. 30. FIG. 32 is a flowchart of the operation of the duty random control according to the present invention. The output current detection circuit 2003 causes the output current Idc to flow and receives a voltage across the resistance R 3, so as to output the voltage signal Vdc proportional to Idc (S1). The A/D converter 2010 converts Vdc into digital data and outputs the same as Ddc (S2). The register 2013 retains reference data Dst corresponding to the target current value and outputs the same to the determination circuit 2011 (S3).

The determination circuit 2011 makes a determination as to which of the values Ddc or Dst is higher in level (S4). The following determination results are conceivable.

Ddc<Dst

Ddc=Dst

Ddc>Dst

The determination circuit 2011 supplies the result of determination to the duty control circuit 2012. The duty control circuit 2012 is supplied with the high-speed clock CLK. The duty control circuit 2012 subjects the clock CLK to frequency division so as to produce a period suitable for the operation of the switching circuit 2002. The PWM signal having an appropriate duty is sent (S5). Giving a specific example;

When Ddc<Dst

In this case, since the output current value is smaller than the target value, the width of the current PWM clock is increased by one.

When Ddc=Dst

Since the output current resides in a desirable range, no change is made to the width of the current clock.

When Ddc>Dst

In this case, since the output current value is greater than the target value, the width of the current PWM clock is decreased by one clock.

The driver circuit 2006 drives the switching element (transistor TR) of the switching circuit 2002 in accordance with the output (logical level) of the duty control circuit 2012 (S 6 ). The switching circuit 2002 receives electric energy from the dc voltage $V_{BB}$, in response to the switching activity, so as to supply a predetermined dc current to the secondary side of the high-frequency transformed T (S7). By repeating steps S1–S7, the current supplied to the load 2001 is maintained at a constant level.

While the description above concerns constant-current control, the same description also applies to constant-voltage control. That is, the output voltage detection circuit is used instead of the output current detection circuit, the other aspects of the operation being the same.

In the embodiment described above, the output current and the reference current value is compared with each other so that negative feedback is properly effected to control the output current value to be equal to the reference value. The duty of the PWM pulse output from the duty control circuit 2012 randomly varies.

According to the embodiment, the duty control circuit 2012 supplied with a high-frequency clock generates a necessary period clock of the PWM signal based on the supplied clock. When the pulse width of the PWM signal is to be increased or decreased, the pulse width is controlled with the width of the one pulse of the supplied clock being designated as a minimum variation. Thus, it is possible to control the output in minimum units of one pulse of the high-frequency clock.

The determination circuit 2011 compares the output Ddc of the A/D converter 2010 and the reference value Dst.

When Ddc<Dst, the pulse width is increased. When Ddc=Dst, the pulse width is maintained. When Ddc>Dst, the pulse width is decreased. By supplying a control signal to the duty control circuit 2012, the output can be stabilized such that the output of the power supply circuit is digitally compared with the reference value and a negative feedback is enforced to control the output of the power supply circuit to be equal to the reference value, in accordance with the result of comparison.

In controlling the PWM signal, there is no limit to the degree of increase or decrease in the pulse width at a constant state. The pulse width is randomly increased or decreased so that the output of the switching power supply is maintained at a constant level.

Figure 33:
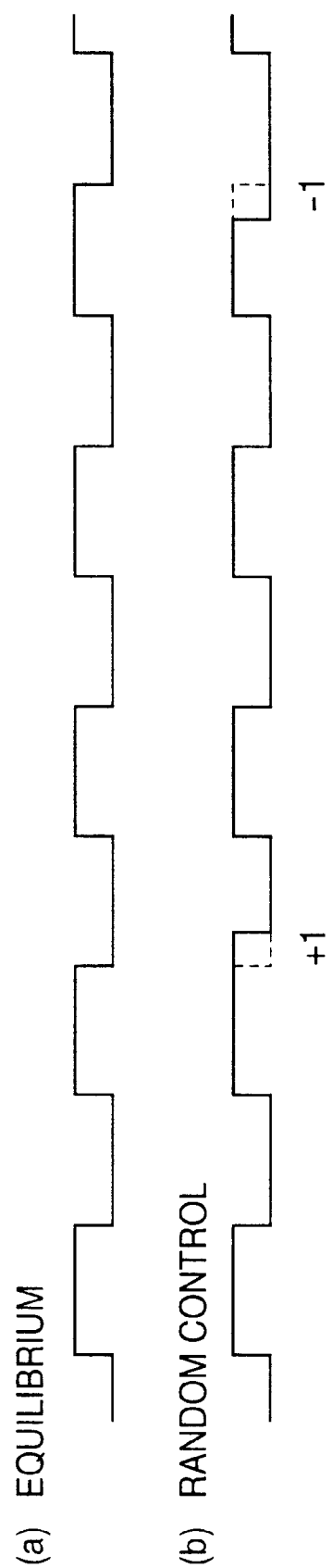
FIG. 33 shows a duty random control system according to the present invention.

FIG. 33 shows a duty random control system according to the present invention, in which the duty is randomly changed. (a) indicates a PWM pulse waveform in an equilibrium state, (b) indicates a PWM pulse waveform when the random control is effected. In this example, the output current is small and the on-time Ton is increased only by one clock. In the present invention, Ton is discretely varied in units of one clock width.

According to the present invention, the duty has discrete values as indicated by the following equation (see FIG. 31).

$$duty = Ton/(Ton+Toff)$$

This is where a difference from the related art lies. In the related art, any duty can be implemented since an analog waveform such as a sawtooth waveform or a triangular waveform is used. The output voltage of the switching power supply according to the invention is given by the following equation.

$$output\ voltage = K \times (Ton/(Ton+Toff)) \times V_{BB}$$
$$= K \cdot duty(\%) \cdot V_{BB}$$

where K indicates a coefficient determined by the ratio of turns in the transformer windings.

That the duty (%) has discrete values means that the output has discrete values. For example, when the high-speed clock at 32.7 MHz is used to produce a period of 256 kHz, only 128 discrete values can be used. For example, when the precision of the A/D converter is subject to a practical 7-bit control (0–127 mA in steps 1 mA), 128 steps are insufficient for the duty.

In order to improve such a situation, the frequency of the high-speed clock may further be increased or the frequency of 256 kHz may further be lowered. However, these approaches are not viable in respect of many technical requirements involved.

Figure 34:
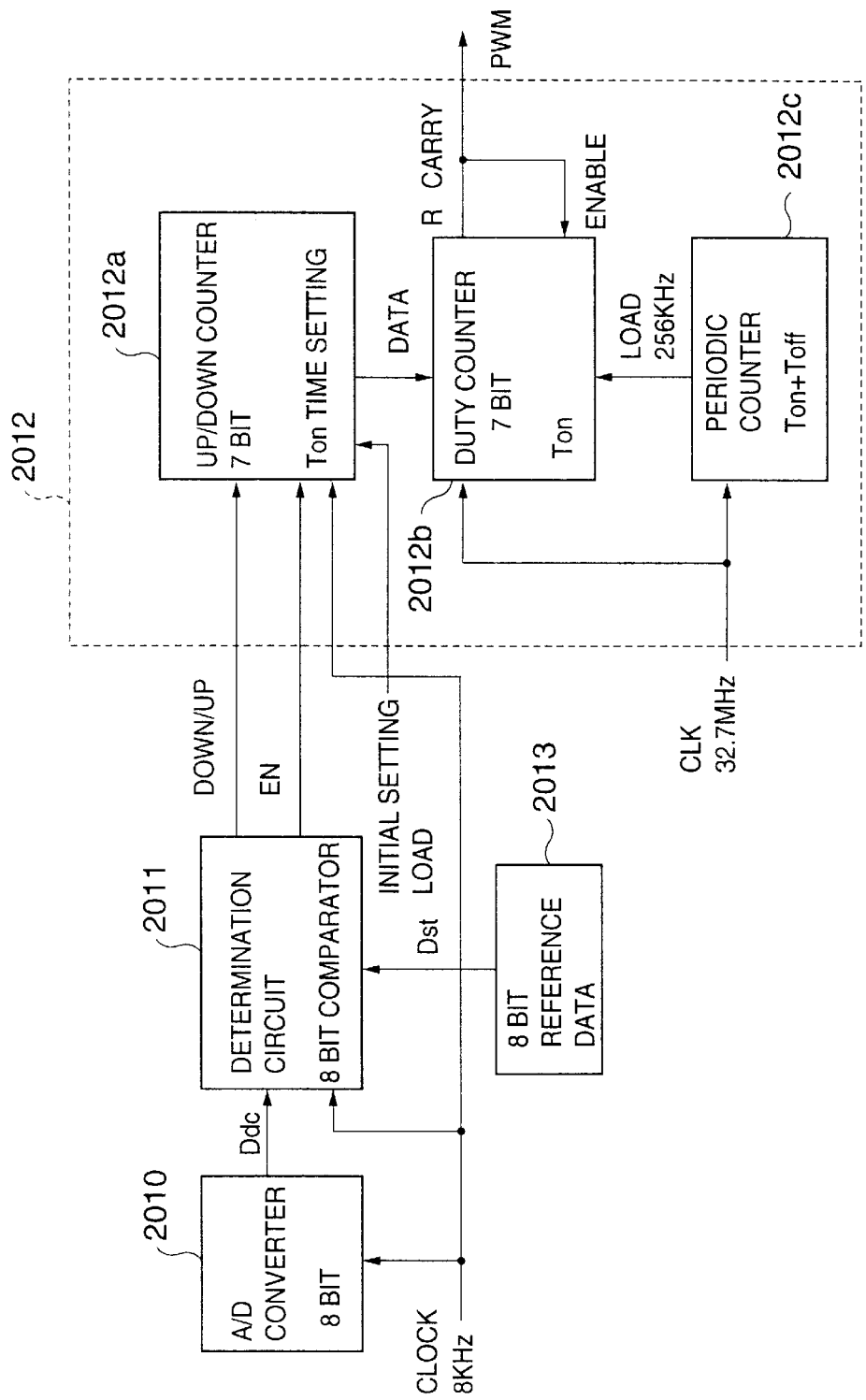
FIG. 34 shows a duty control according to another embodiment of the present invention.

A desired output can be obtained by dynamically increasing or decreasing the width of the duty pulse between adjacent pulses. FIG. 34 shows such an approach. Referring to FIG. 34, the A/D converter 2010 operates at a sampling period of 8 kHz and 8 bits. The reference value of the determination circuit 2011 also includes 8 bits. The determination circuit 2011 operates at 8 kHz. The duty control circuit 2012 comprises a 7-bit up/down counter 2012*a* and a 7-bit duty counter 2012*b* and a period counter 2012*c*.

The up/down counter 2012*a* receives a down/up signal (output of the determination circuit 2011), an enable signal, a 8-kHz clock, an initial value as load signals, so as to set a Ton time. The duty counter 2012*b* receives a 32.7 MHz clock, an output of the up/down counter 2012*a*, a load clock of 256 kHz from the period counter 2012*c*, so as to output a PWM pulse. The period counter 2012*c* subjects the 32.7 MHz clock to frequency division so as to generate a 256 kHz clock to be supplied to the duty counter 2012*b*. A description will be given of the operation of the circuit thus constructed.

The determination circuit 2011 supplies an enable signal EN and a down/up signal to the up/down counter 2012*a* of the duty control circuit 2012.

That is, in case Ddc>Dst, the enable signal EN is set at an L level to activate the same. The down/up signal is set at an L level so as to initiate a down-count process. When Ddc=Dst, the enable signal is set at an H level to inactivate the same. The down/up signal is set at an indefinite value (either H or L). When Ddc<Dst, the enable signal EN is set at an L level to activate the same. The down/up signal is set at an H level so as to initiate an up-count process.

The output Data of the up/down counter 2012*a* is controlled by the result of the determination by the determination circuit 2011. The output Data of the up/down counter 2012*a* is initial data for the duty counter 2012*b*. The period counter 2012*c* subjects the clock at 32.7 MHz to frequency division so as to produce a clock at 256 kHz, and sends a load signal at a period of 256 kHz to the duty counter 2012*b*.

The duty counter 2012*b* receives the up/down counter Data of the up/down counter at 256 kHz (once in every 3.9 μs) as an initial value. The duty counter performs an up-count from an initial value to a maximum value (FFFFFFF) of the counter at the 32.7 MHz clock. When the maximum value of the counter is reached, the duty counter sends a ripple carry. When the ripple carry is input to the enable terminal of the counter, the up-count is halted even when the clock arrives. The count is re-started by an initial value being re-loaded at the next 256 kHz period. Accordingly, the output of the ripple carry becomes a PWM signal which has a period of 256 kHz and is turned on while the count proceeds from the initial value to the maximum value. By dynamically varying the output Data (initial value) of the up/down counter 2012*a*, the pulse width (Ton) of the PWM signal is varied dynamically.

Thus, the circuit shown in FIG. 34 implements the duty random change system and operates such that by varying the count of the up/down counter 2012*a* in accordance with the result of determination by the determination circuit 2011, and by setting new duty information in the duty counter 2012*b* at a period of 8 kHz, the output is maintained at a constant level.

For stability of the switching power supply circuit, it is necessary to moderately adapt to an abrupt change in the detection output. This is exhibited in the related art by the error amplifier forming a low-pass filter. In the present invention, the function of the low-pass filter is implemented by the fact that data import by the A/D converter 2010 is performed by 8 kHz sampling and the operation of the up/down counter is allowed to occur only at a period of 8 kHz.

The control of the PWM pulse is as shown in FIG. 33. The on-time Ton of PWM is randomly incremented by +1 or −1 in units of the width of one clock, in accordance with the result of determination by the determination circuit 2011.

Figure 36:
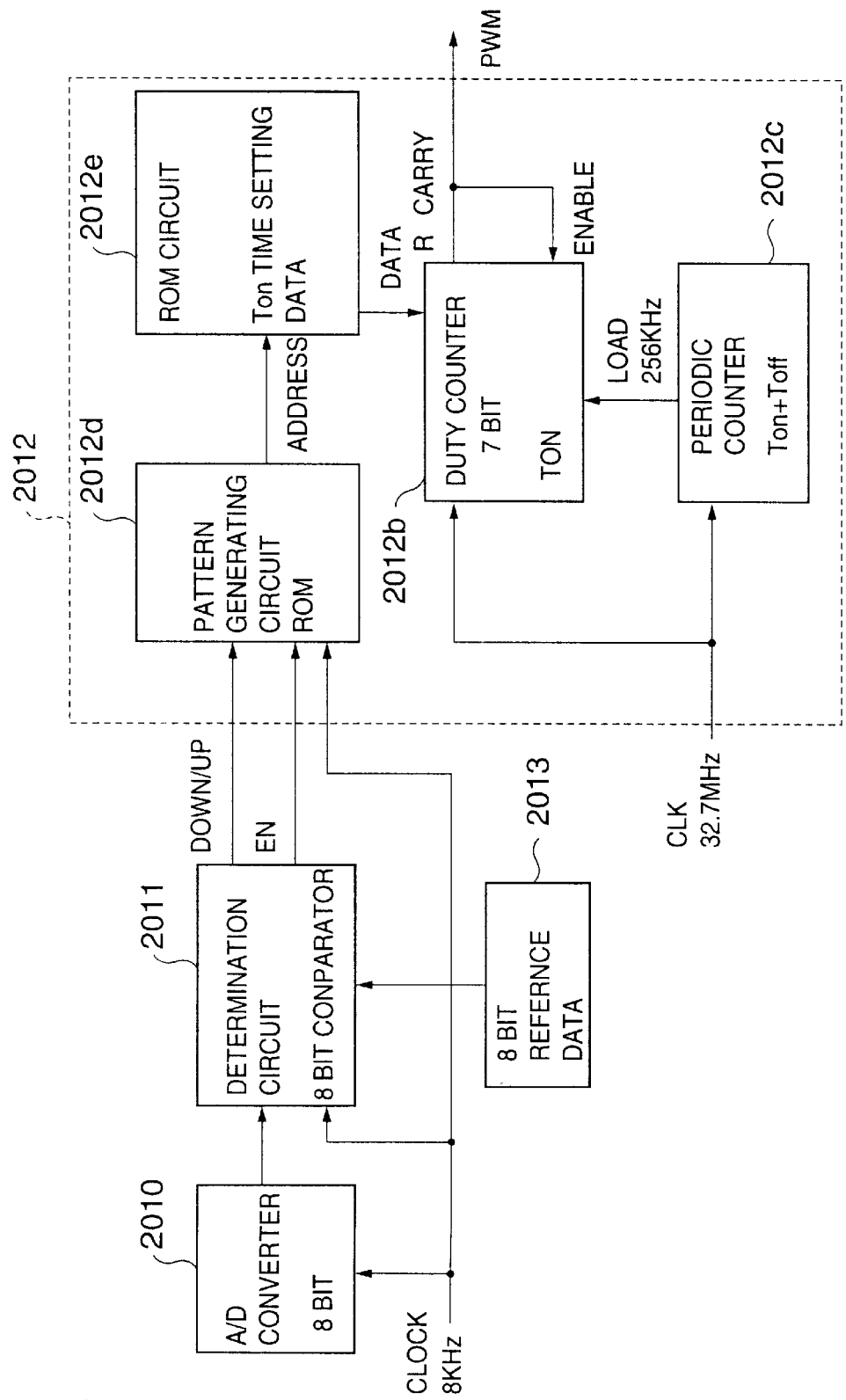
FIG. 36 shows a duty control according to still another embodiment of the present invention.

FIG. 36 shows a duty control according to still another embodiment. In FIGS. 34 and 36, like numerals represent like components. The most notable feature of this embodiment is that the duty of the PWM pulse is not changed randomly. The value of the duty is restricted to certain patterns (duty regulating system).

A pattern generating circuit 2012*d* of the duty control circuit 2012 stores a plurality of patterns of the duty. The pattern generating circuit 2012*d* is embodied by, for example, a ROM. A ROM Circuit 2012*e* receives output data from the pattern generating circuit 2012*d* as address data and outputs corresponding Ton time setting data. The output of the ROM circuit 2012*e* is supplied to the duty counter 2012*b* as data. The duty counter 2012*b* counts the clock in a time width provided by the ROM circuit 2012*e*. The PWM pulse is output from the duty counter 2012*b*.

Figure 37:
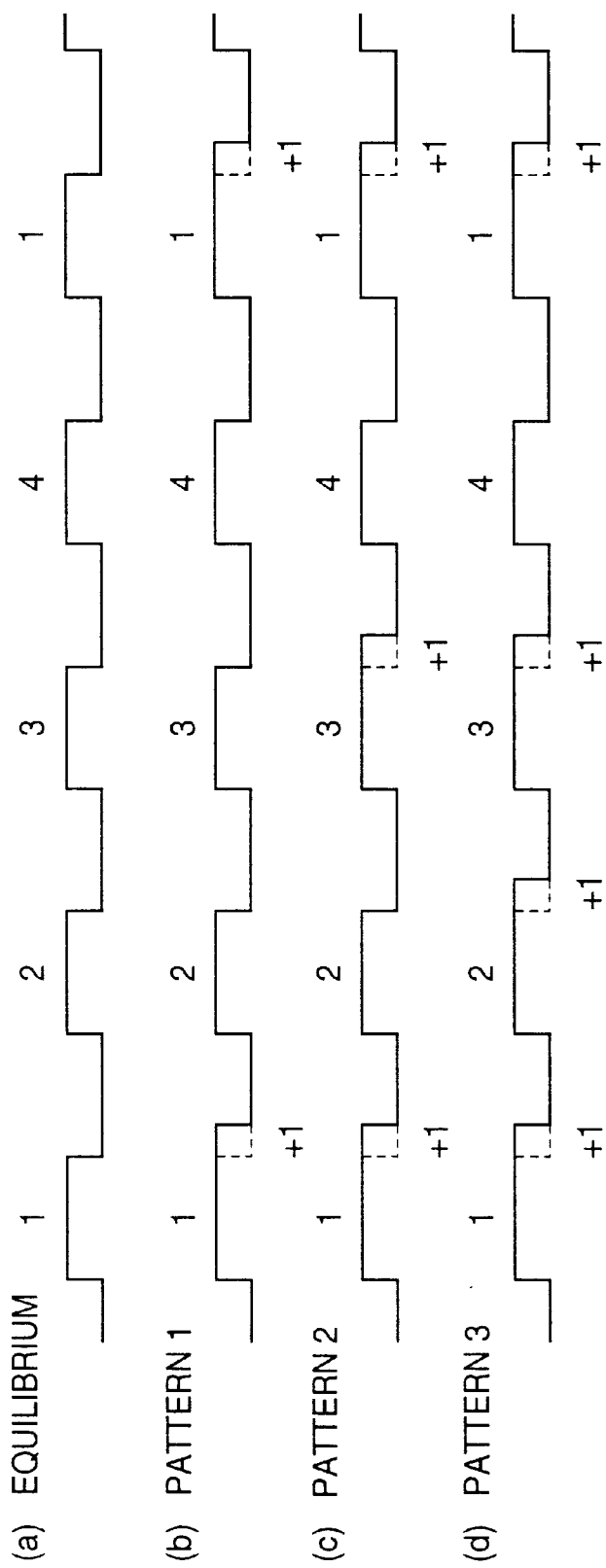
FIG. 37 shows examples of patterns according to a duty regulating system.

FIG. 37 shows examples of patterns according to the duty regulating system. These patterns are stored in the pattern generating circuit 2012*d*. (a) indicates a pattern in an equilibrium state. (b) indicates a pattern wherein the Ton time is increased by one clock (pattern 1), maintaining a regular period. (c) indicates a pattern where the Ton time is increased by one clock (pattern 2), maintaining a regular period shorter than the period of the pattern (b). (d) indicates a pattern where the Ton time is increased by one clock (pattern 3), maintaining a regular period even shorter than the period of the pattern (c). While FIG. 37 shows only patterns in which the clock is increased. Patterns wherein the clock is decreased are also stored in the pattern generating circuit 2012. A description will be given of the operation of the switching power supply circuit thus constructed.

Figure 35:
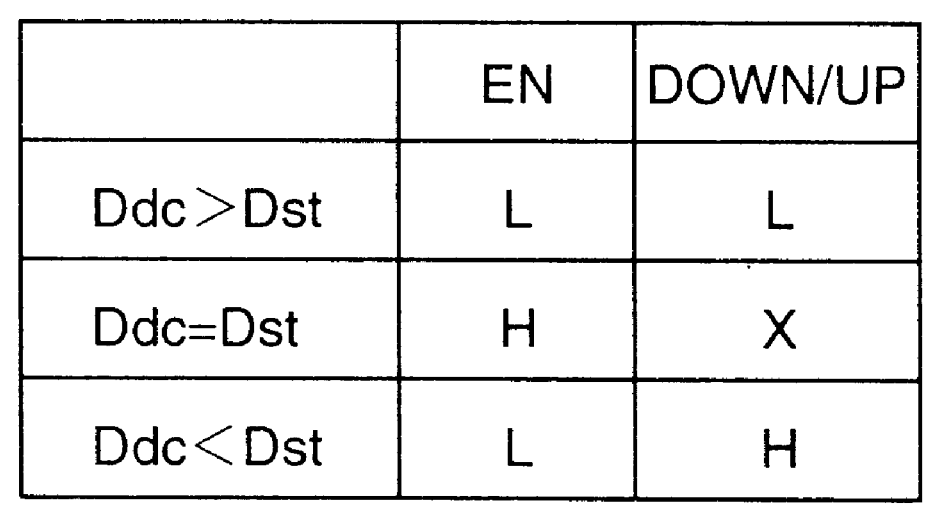

As shown in FIG. 35, the determination circuit 2011 supplies an enable signal EN (down/up) to the pattern generating circuit 2012*d* of the duty control circuit 2012. In case Ddc>Dst, the enable signal EN is set at an L level to activate the same. When Ddc=Dst, the enable signal is set at an H level to inactivate the same. The down/up signal is set at an indefinite value (either H or L). When Ddc<Dst, the enable signal EN is set at an L level to activate the same. The down/up signal is set at an H level.

The pattern generating circuit 2012*d* selects the most appropriate pattern adapted for the input signal and supplies the same to the ROM circuit 2012*e*. The ROM circuit 2012*e* receives the data from the pattern generating circuit 2012*d* as address data and supplies the data stored in the address to the duty counter 2012*b*.

The 32.7 MHz clock is counted at the width of the data output from the ROM circuit 2012*e*. The resultant pulse is output as the PWM pulse. The PWM pulse has a period of 256 kHz. The on-time Ton of the pulse is varied according to several patterns. The circuit shown in FIG. 36 is constructed such that the pattern generated by the pattern generating circuit 2012*d* is varied in accordance with the result of determination by the determination. circuit 2011. New duty information is set in the duty counter 2012*b* at 8 kHz so that the PWM pulse is varied under certain restrictions. In this way, the output is maintained at a constant level.

For example, when the output is slightly lower than the reference level, the pattern 1 (see FIG. 37) is output. When the output is lower than the reference level by some degree, the pattern 2 is selected. When the output is significantly lower than the reference level, the pattern 3 is selected. Conversely, when the output is higher than the reference level, the clock is slowed down so that a pattern wherein the on-time Ton is shortened is generated.

A description will now be given of the effects provided by generating the PWM pulse under certain restrictions. The embodiment shown in FIG. 34 is constructed such that the duty of the PWM pulse is randomly changed. In this case, the period of on-time Ton is completely randomly determined. In a circuit susceptible to noise such as a subscriber circuit, low-frequency noise in the power feed unit in such an arrangement may present a problem.

Harmonics having frequencies several times as high as the basic frequency of 256 kHz of a rectangular wave are generated as noise. When the duty is frequently changed, spectral components having lower frequencies than 256 kHz are generated. That is, in random control, low-frequency spectrum is created.

In contrast, when a certain restriction is imposed on the variation of the PWM pulse width (see FIG. 37), a 64 kHz spectrum is generated in the pattern 1, a 128 kHz spectrum is generated in the pattern 3. In the pattern 2, a 128 kHz spectrum is generated. However, spectrum lower than these are not generated by principle.

Figure 38:
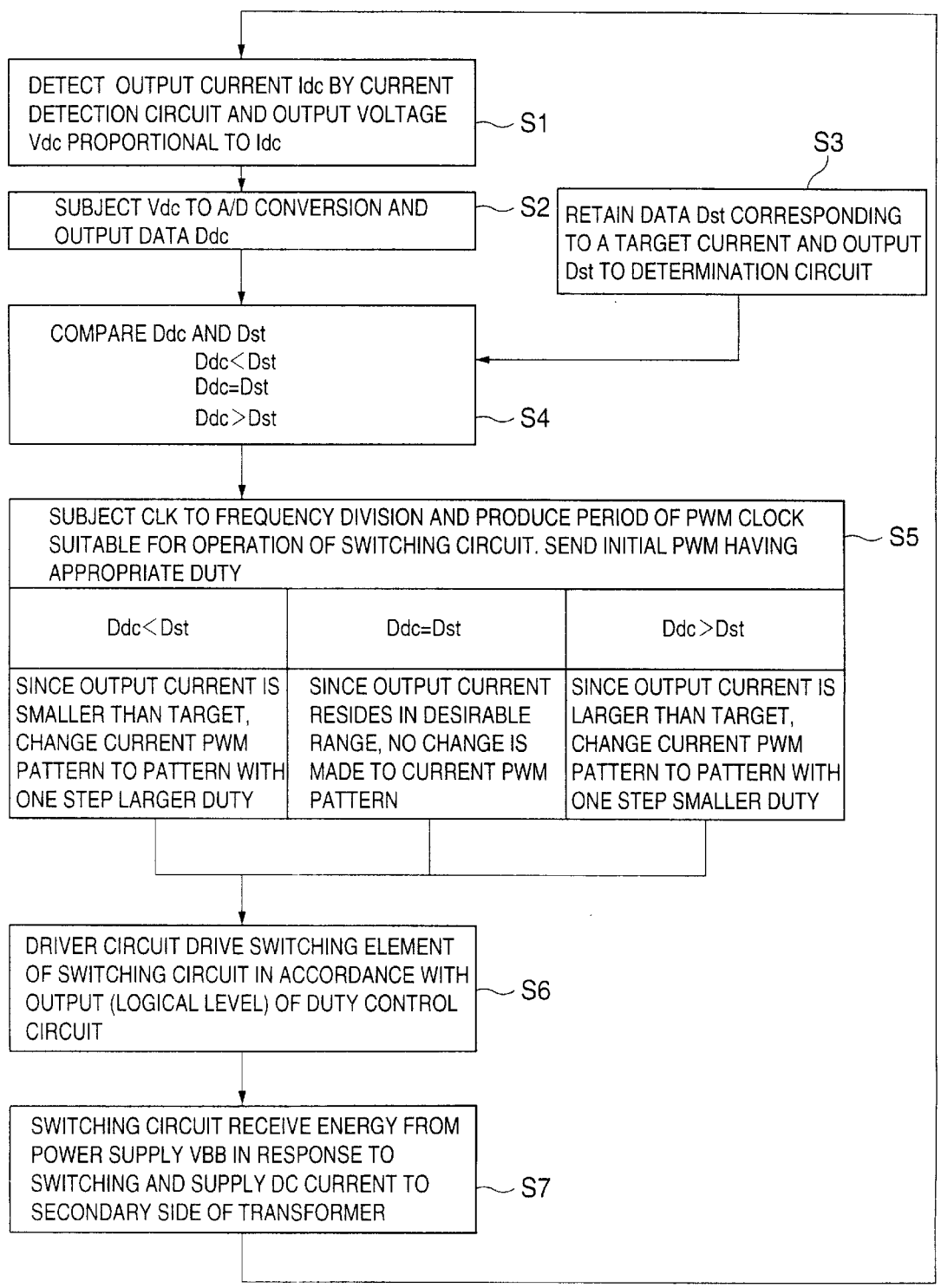
FIG. 38 is a flowchart showing an operation of the duty regulating system.

A description will be given, with reference to the flowchart of FIG. 38, of the operation of the circuit shown in FIG. 36. The output current detection circuit 2003 receives the voltage generated across the resistance R3 due to the output current Idc, so as to output the voltage signal Vdc proportional to the output current Idc (S1). The A/D converter 2010 converts Vdc into digital data and outputs the same as Ddc (S2). The register 2013 retains the data Dst corresponding to the target current value and outputs the same to the determination circuit 2011 (S3).

The determination circuit 2011 makes a determination as to which of the values Ddc or Dst is higher in level (S4). The following determination results are conceivable.

Ddc<Dst

Ddc=Dst

Ddc>Dst

The determination circuit 2011 supplies the result of determination to the duty control circuit 2012. The duty control circuit 2012 is supplied with the high-speed clock CLK. The duty control circuit 2012 produces a period of the PWM clock suitable for the operation of the switching circuit 2002 by inserting the clock to Ton or curtailing the clock. The PWM signal having an appropriate duty is sent (S5). Giving a specific example;

When Ddc<Dst

In this case, since the output current value is smaller than the target value, the pattern generating circuit 2012 d changes the current PWM pattern into a pattern which is one step larger.

When Ddc=Dst

Since the output current resides in a desirable range, no change is made to the PWM pattern.

When Ddc>Dst

In this case, since the output current value is greater than the target value, the pattern generating circuit 2012$d$ changes the current PWM pattern into a pattern which is one step smaller.

The driver circuit 2006 drives the switching element (transistor TR) of the switching circuit 2002 in accordance with the output (logical level) of the duty control circuit 2012 (S6). The switching circuit 2002 receives electric energy from the dc voltage $V_{BB}$, in response to the switching activity, so as to supply a predetermined dc current to the secondary side of the high-frequency transformed T (S7). By repeating steps S1–S7, the current supplied to the load 2001 is maintained at a constant level.

While the description above concerns constant-current control, the same description also applies to constant-voltage control. That is, the output voltage detection circuit is used instead of the output current detection circuit, the other aspects of the operation being the same.

In this embodiment, the output of the determination circuit 2011 is connected to the pattern generating circuit 2012$d$. A determination is made as to which of the patterns as shown in FIG. 37 is used. The ROM circuit 2012$e$ sets the time Ton in the duty counter 2012$b$. The pattern generating circuit 2012$d$ outputs the address information of the ROM circuit 2012$e$ so that the data is set. The pattern generating circuit 2012$d$ changes the required pattern at a period of 8 kHz or longer.

According to the embodiment described above, the PWM pattern can be easily produced by imposing certain restrictions on the increase and decrease of the pulse width and by storing the patterns in the memory.

In further accordance with the embodiment, by providing several PWM patterns for driving the switching circuit, and by selecting one of the patterns, the switching power supply in which low-frequency noise in the power feed circuit is suppressed is implemented.

Referring to the duty random change system or the duty regulating system, when the output load increases abruptly, requiring a significant change in the pulse width of the switching element, the width of the duty pulse can be changed to a great extent, for example, for a span of several clocks. Accordingly, it is possible to adapt for an abrupt change in the output load.

The present invention is not limited to the above described embodiments, and variations and modifications may be made without departing from the scope of the present invention.

What is claimed is:

1. A subscriber circuit comprising:

a DC/DC converter selectively providing a dc voltage from a primary side to a secondary side;

an electronic choke circuit, coupled in series between an output of the DC/DC converter and a subscriber line blocking an analog signal;

a voltage and current detection circuit directly detecting a voltage and a current of the subscriber line, and producing an output; and a controller, respondive to the output of said voltage and current detection circuit, controlling the DC/DC converter to produce a voltage commensurate with a power feed resistance.

2. The subscriber circuit as claimed in claim 1, wherein said controller computes or detects a voltage drop commensurate with a power feed resistance, produces a pulse width modulation signal associated with a difference between a target current commensurate with the voltage drop and a current loop current, and controls the DC/DC converter accordingly.

3. The subscriber circuit as claimed in claim 1, wherein said controller computes or detects a voltage drop commensurate with a power feed resistance, determines a value associated with a difference between a target current commensurate with the voltage drop and a current loop current, and produces a pulse width modulation signal by counting the value as a pulse width time.

4. The subscriber circuit as claimed in claim 3, further comprising:

a storage section storing a value related to a period of the pulse width modulation signal, wherein a frequency of the pulse width modulation signal is varied by periodically counting time based on the value stored in said storage section.

5. A subscriber circuit comprising:

a DC/DC converter selectively providing a dc voltage from a primary side to a secondary side;

an electronic choke circuit, coupled in series between an output of the DC/DC converter and a subscriber line blocking an analog signal;

a voltage and current detection circuit directly detecting a voltage and a current of the subscriber line, and producing an output; and a controller, responsive to the output of said voltage and current detection circuit, controlling the DC/DC converter to produce a voltage commensurate with a power feed resistance, a switch, coupled between the primary side and the secondary side of the DC/DC converter, putting the primary side and the secondary side to one of a floating state and a non-floating state.

6. The subscriber circuit as claimed in claim 5, wherein said switch fixes a mid-point potential of a floating power feed unit to a predetermined fixed potential.

7. A subscriber circuit comprising:

a DC/DC converter selectively providing a dc voltage from a primary side to a secondary side;

an electronic choke circuit, coupled in series between an output of the DC/DC converter and a subscriber line blocking an analog signal;

a voltage and current detection circuit directly detecting a voltage and a current of the subscriber line, and producing an output; and a controller, responsive to the output of said voltage and current detection circuit, controlling the DC/DC converter to produce a voltage commensurate with a power feed resistance, wherein a first transformer for an analog signal and a second transformer for a digital signal are coupled in series, the first and second transformers remain coupled in series when the subscriber circuit is used as an analog subscriber circuit, and one of the first and second transformers is short-circuited when the subscriber circuit is used as a digital subscriber circuit.

* * * * *